US012800766B2

(12) United States Patent
Xu et al.

(10) Patent No.: US 12,800,766 B2
(45) Date of Patent: Nov. 17, 2026

(54) METHODS AND SYSTEMS FOR EXTRACTING HEADWAY DATA FROM LIDAR SENSOR DATA

(71) Applicant: Board of Regents of the Nevada System of Higher Education, on behalf of the University of Nevada, Reno, Reno, NV (US)

(72) Inventors: Hao Xu, Reno, NV (US); Trevor Whitley, Reno, NV (US)

(73) Assignee: Board of Regents of the Nevada System of Higher Education, on behalf of the University of Nevada, Reno, Reno, NV (US)

( * ) Notice: Subject to any disclaimer, the term of this patent is extended or adjusted under 35 U.S.C. 154(b) by 504 days.

(21) Appl. No.: 18/505,375

(22) Filed: Nov. 9, 2023

(65) Prior Publication Data

US 2025/0155574 A1 May 15, 2025

(51) Int. Cl.

*G01S 17/88* (2006.01)
*G01S 7/51* (2006.01)
*G01S 17/66* (2006.01)
*G08G 1/01* (2006.01)
*G08G 1/04* (2006.01)

(52) U.S. Cl.

CPC ................ *G01S 17/88* (2013.01); *G01S 7/51* (2013.01); *G01S 17/66* (2013.01); *G08G 1/0116* (2013.01); *G08G 1/04* (2013.01)

(58) Field of Classification Search

CPC ............ G01S 17/88; G01S 7/51; G01S 17/66; G08G 1/0116; G08G 1/04

USPC .......................................................... 701/117

See application file for complete search history.

(56) References Cited

U.S. PATENT DOCUMENTS

| | | | | |
|---|---|---|---|---|
| 11,275,673 | B1 * | 3/2022 | Dolan | G06F 30/15 |
| 2017/0356993 | A1 * | 12/2017 | Lee | G01S 13/93 |
| 2021/0190512 | A1 * | 6/2021 | Choi | G06V 20/56 |
| 2022/0148416 | A1 * | 5/2022 | Eldessouki | G08G 1/0133 |
| 2023/0417912 | A1 * | 12/2023 | Xu | G01S 17/66 |
| 2024/0248186 | A1 * | 7/2024 | Wu | G01S 7/4972 |
| 2025/0314778 | A1 * | 10/2025 | Plaut | G01S 17/931 |

FOREIGN PATENT DOCUMENTS

| | | | | |
|---|---|---|---|---|
| AU | 2006259428 A1 | * | 12/2006 | G08G 1/087 |
| WO | WO-2013128427 A1 | * | 9/2013 | G08G 1/0125 |

* cited by examiner

*Primary Examiner* — Tuan C To

(74) *Attorney, Agent, or Firm* — Buckley, Maschoff & Talwalkar LLC

(57) ABSTRACT

Methods and apparatus for extracting headway information from LiDAR trajectory data received from a roadside LiDAR sensor system. In an embodiment, a LiDAR data processor pre-processes raw roadside LiDAR sensor data, extracts headway data from the pre-processed raw roadside LiDAR sensor data and extracts critical headway data from the extracted headway data. In some implementations, the pre-processing may include filtering background information from the raw roadside LiDAR sensor data, clustering objects in the filtered LiDAR sensor data, and classifying the clustered objects, wherein the clustered objects represent road users. In addition, in some embodiments the LiDAR data processor may track movement of the clustered objects in real-time to extract trajectory and speed data, and then map the extracted trajectory and speed data such that the clustered objects are georeferenced.

16 Claims, 13 Drawing Sheets

METHODS AND SYSTEMS FOR EXTRACTING HEADWAY DATA FROM LIDAR SENSOR DATA

BACKGROUND

Light Detection and Ranging (LiDAR) is a remote sensing technology that emits laser light to illuminate and detect objects and map their distance measurements. Specifically, a LiDAR device targets an object with a laser and then measures the time for the reflected light to return to a receiver. LiDAR has been utilized for many different types of applications such as making digital 3-D representations of areas on the earth's surface and ocean bottom. LiDAR sensors have also been used in the intelligent transportation field because of their powerful detection and localization capabilities. For example, LiDAR sensors have been installed on autonomous vehicles (or self-driving vehicles) and used in conjunction with other sensors, such as digital video cameras and radar devices, to enable the autonomous vehicle to safely navigate along roads.

It has recently been recognized that LiDAR sensors could potentially be deployed as part of the roadside infrastructure, for example, incorporated into a traffic light system at intersections or otherwise positioned in roadside locations as a detection and data generating apparatus. LiDAR can be used to collect three-dimensional traffic data without being affected by light conditions, and the detected traffic data can then be used by connected vehicles (CVs) and by other infrastructure systems to aid in preventing collisions and to protect non-motorized road users (such as pedestrians). The traffic data may also be used to evaluate the performance of autonomous vehicles, and for the general purpose of collecting traffic data for analysis. For example, roadside LiDAR sensor data at a traffic light can be used to identify when and where vehicle speeding is occurring, and it can provide a time-space diagram which shows how vehicles slow down, stop, speed up and go through the intersection during a light cycle. In addition, roadside LiDAR sensor data can be utilized to identify "near-crashes," where vehicles come close to hitting one another (or close to colliding with a pedestrian or a bicyclist), and thus identify intersections or stretches of roads that are potentially dangerous.

A common misconception is that the application of roadside LiDAR sensors is similar to the application of on-board vehicle LiDAR sensors, and that therefore the same processing procedures and/or algorithms utilized by on-board LiDAR systems could be applicable to roadside LiDAR systems (possibly with minor modifications). However, on-board LiDAR sensors mainly focus on the surroundings of the vehicle and the goal is to directly extract objects of interest from a constantly changing background. In contrast, roadside LiDAR sensors must detect and track all road users in a traffic scene against a static background. Thus, infrastructure-based, or roadside LiDAR sensing systems have the capability to provide behavior-level multimodal trajectory data of all traffic users, such as presence, location, speed, and direction data of all road users gleaned from raw roadside LiDAR sensor data. In addition, low-cost sensors may be used to gather such real-time, all-traffic trajectories for extended distances, which can provide critical information for connected and autonomous vehicles so that an autonomous vehicle traveling into the area covered by a roadside LiDAR sensor system becomes aware of potential upcoming collision risks and the movement status of other road users while the vehicles are still at a distance away from the area or zone. Thus, the tasks of obtaining and processing trajectory data are different for a roadside LiDAR sensor system than for an on-board vehicle LiDAR sensor system.

It should be noted that LiDAR systems also offer certain advantages over video and vision-based systems. In particular, the analysis of infrastructure-based video data requires significantly more processing and computing power. Also, bad illumination conditions such as nighttime recordings adversely affect video quality, but such conditions do not affect the quality of LiDAR system data. Roadside LiDAR systems therefore have the advantage over other sensing and detection technologies (such as inductive loop, microwave radar, and video camera technologies) in the ability to get trajectory-level data and improved performance in accurate detection and tracking of pedestrians and vehicles. While LiDAR sensors collect data in the form of three-dimensional (3D) cloud points, roadside vision-based systems collect data mostly in the form of two-dimensional (2D) high-resolution images. Cloud points have relatively lower density but greater accuracy than high-resolution images. Another advantage of roadside LiDAR-based systems is a wider detection range. LiDAR-based sensing systems can cover distances ranging from a few meters to more than 200 meters as opposed to roadside vision-based sensing systems which cannot cover the same range.

In addition to supporting connected and autonomous vehicles, the all-traffic trajectory data generated by a roadside LiDAR system may be valuable for traffic study and performance evaluation, advanced traffic operations, and the like. For example, analysis of lane-based vehicle volume data can achieve an accuracy above 95%, and if there is no infrastructure occlusion, the accuracy of road volume detection can generally be above 98% for roadside LiDAR systems. Other applications for collected trajectory data include providing conflict data resources for near-crash analysis, including collecting near-crash data (especially vehicle-to-pedestrian near-crash incidents) that occur during low-light level situations such as during rainstorms, at dusk, and/or during nighttime hours after dark. In this regard, roadside LiDAR sensors deployed at fixed locations (e.g., road intersections and along road medians) provide a good way to record trajectories of all road users over the long term, regardless of illumination conditions. Traffic engineers can then study the historical trajectory data provided by the roadside LiDAR system at multiple scales to define and extract near-crash events, identify traffic safety issues, and recommend countermeasures and/or solutions.

Headway, which is defined as the time gap between vehicles in a traffic stream, serves as a pivotal metric in the realm of traffic engineering. Headway measurement holds substantial importance for understanding and improving traffic safety and for enhancing the capacity analysis of traffic networks. A clear understanding of headway is essential for determining the efficiency and safety of vehicular flow. Using roundabouts as a prime example, this document delves into the methodologies behind automatic headway extraction. By elucidating this technique, it aims to provide a comprehensive framework that can be applied to other traffic scenarios as well.

Roundabouts may be described as circular intersections where the entry by vehicles is yield controlled and the circulatory lane (or circulatory lanes) constitutes an uninterrupted flow of vehicles circulating around a central island in a counterclockwise direction (in the United States). Operational performance at roundabouts has been a topic of discussion since the emergence of roundabouts in the United States in the 1990s and as their popularity has grown.

Specifically, roundabouts are generally known to reduce delays for low to medium traffic volumes and are also regarded as safer alternatives to other types of intersections because of a reduction in conflict zones, the elimination of head-on and/or perpendicularly angled crashes (for example, "T-bone" collisions), the reduction in speed of vehicles utilizing the roundabout, and the reduction of vehicular delays and full stops. In addition, because of improved operational performance roundabouts are known to produce lower emissions when compared to other intersection controls at low to medium traffic volumes.

Capacity represents the maximum sustainable hourly flow rate at which persons or vehicles reasonably can be expected to traverse a point or a uniform segment of a lane or roadway during a given time period under prevailing roadway, environmental, traffic, and control conditions. Many methods have been proposed for computing capacity at roundabouts such as by using regression models or by using analytic models. However, the industry of traffic engineering utilizes the Highway Capacity Manual (HCM) as a guide to measuring capacity and for other performance measures such as level of service (LOS), delay, queue, and volume-to-capacity ratio.

In the specific case of roundabouts, the HCM employs a combination of regression and analytic models to derive a relationship between conflicting traffic flow and capacity of entry flow. The conflicting traffic flow is the circulating flow, and the capacity of the entry is at the entry lanes of a roundabout leg. Entry capacity decreases as the conflicting circular flow increases within the roundabout. In addition, the analytic model that the HCM employs is based on the gap acceptance theory which has been a useful model for explaining two-way stopped controlled intersections where a vehicle in a minor stream of traffic needs to decide which gap or headway (length of roadway) is large enough to safely enter into a major stream of traffic. The minor stream of traffic for roundabouts as discussed herein refers to the entry lane(s) (which is yield controlled) whereas the major stream refers to the circulatory lane(s) (one or more depending on the size of the roundabout).

Regarding roundabouts, a minor stream driver may be referred to as the driver of the decision vehicle. In addition, the headway which the decision driver is willing to 'accept' and enter into the flow of the major stream vehicle(s) is a function of many factors. For example, the headway for a particular driver may depend on such factors as the vehicle driver's experience, environmental factors, geometric design (of the roadway), speed of the major stream vehicle, traffic volume, and more. The tendency for the decision driver to either reject a headway or accept a headway is captured by measuring the "critical headway" which is the minimum time between two successive major stream vehicles for which the minor stream decision vehicle can make a maneuver to enter the major stream. Thus, the term "critical headway" is one of the gap acceptance parameters used. Another gap acceptance parameter is follow-up headway, which is the time headway between the departure of one minor stream vehicle and the departure of a subsequent minor stream vehicle into the major stream of vehicles utilizing the same gap under the condition of continuous queueing. The HCM (Highway Capacity Manual) provides such gap acceptance parameters which are based on field data gathered across the United States which is used to derive a capacity equation that is a function of the conflicting flow.

The inventors have recognized that there is a need for providing improved processes which are capable of automatically extracting headway information, both for roundabouts and for intersections.

BRIEF SUMMARY

Presented are methods and apparatus for extracting headway information from LiDAR trajectory data received from a roadside LiDAR sensor system. In an embodiment, a LiDAR data processor pre-processes raw roadside LiDAR sensor data, extracts headway data from the pre-processed raw roadside LiDAR sensor data and extracts critical headway data from the extracted headway data. In some implementations, the LiDAR data processor may pre-process the raw roadside LiDAR sensor data by filtering background information from the raw roadside LiDAR sensor data, clustering objects in the filtered LiDAR sensor data, classifying the clustered objects, wherein the clustered objects represent road users, tracking movement of the clustered objects in real-time to extract trajectory and speed data, and mapping the extracted trajectory and speed data such that the clustered objects are georeferenced.

In some embodiments, filtering the background information from the raw roadside LiDAR sensor data may include the LiDAR data processor aggregating multiple LiDAR sensor data frames, dividing the aggregated frames into small and continuous three-dimensional (3D) cubes, identifying laser points in the 3D cubes as background cloud points, and excluding the background cloud points. In some implementations, identifying a laser point in the 3D cubes as a background cloud point may include determining a background cloud point when the number of laser points exceeds a threshold value.

Some embodiments of the method may include, prior to tracking the movement of clustered objects, assigning, by the LiDAR data processor, a unique identifier to each clustered object. In addition, in some implementations clustering objects in the filtered LiDAR sensor data may include utilizing one of a density-based spatial clustering application with a noise (DBSCAN) or an adaptive DBSCAN clustering algorithm. In addition, some implementations may include the LiDAR data processor uploading the mapped data into an ArcGIS program for further analysis. Moreover, the process may include the LiDAR data processor displaying the critical headway data on a display screen for viewing by a user. In addition, the method may include the LiDAR data processor calibrating a Highway Capacity Manual (HCM) capacity equation.

In another aspect, presented is a roadside LiDAR data processing computer that operates to extract headway information from LiDAR trajectory. The LiDAR data processing computer may include a LiDAR data processor, a communication device operatively coupled to the LiDAR data processor, and a storage device operatively coupled to the LiDAR data processor. In embodiments described herein, the storage device stores processor executable instructions which when executed cause the LiDAR data processor to pre-process raw roadside LiDAR sensor data received from a roadside LiDAR sensor system, extract headway data from the pre-processed raw roadside LiDAR sensor data and extract critical headway data from the extracted headway data. In some implementations, the storage device stores further processor executable instructions concerning pre-processing, which when executed may cause the LiDAR data processor to filter background information from the raw roadside LiDAR sensor data, cluster objects in the filtered LiDAR sensor data, classify the clustered objects, wherein the clustered objects represent road users, track movement of the clustered objects in real-time to extract trajectory and speed data, and map the extracted trajectory and speed data such that clustered objects are georeferenced.

In some embodiments, the storage device of the roadside LiDAR data processing computer stores further processor executable instructions concerning filtering, which when executed cause the LiDAR data processor to aggregate multiple LiDAR sensor data frames, divide the aggregated frames into small and continuous three-dimensional (3D) cubes, identify laser points in the 3D cubes as background cloud points, and exclude the background cloud points. In some implementations, the instructions for identifying a laser point in the 3D cubes as a background cloud point may include processor executable instructions, which when executed cause the LiDAR data processor to determine a background cloud point when the number of laser points exceeds a threshold value. The storage device may also include further processor executable instructions, prior to the instructions for tracking the movement of clustered objects, which when executed cause the LiDAR data processor to assign a unique identifier to each clustered object. In addition, the instructions for clustering may include processor executable instructions, which when executed causes the LiDAR data processor to utilize one of a density-based spatial clustering application with a noise (DBSCAN) or an adaptive DBSCAN clustering algorithm. In some implementations, the storage device may store further processor executable instructions which when executed cause the LiDAR data processor to upload the mapped data into an ArcGIS program for further analysis.

Some embodiments of the roadside LiDAR data processing computer also include a display screen that is operably coupled to the LiDAR data processor, and the storage device may store further processor executable instructions which when executed cause the LiDAR data processor to display the critical headway data on the display screen. The storage device may also store further processor executable instructions which when executed cause the LiDAR data processor to calibrate a Highway Capacity Manual (HCM) capacity equation.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and example embodiments and which are not necessarily drawn to scale, wherein.

DETAILED DESCRIPTION

Figure 1A:
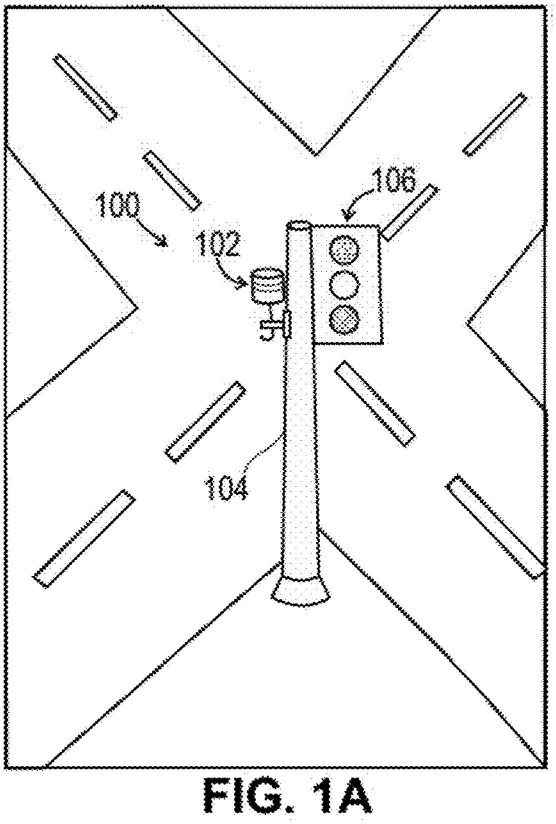
FIG. 1A depicts a LiDAR sensor system installation located at an intersection of roadways in accordance with some embodiments of the disclosure.

Reference will now be made in detail to various novel embodiments, examples of which are illustrated in the accompanying drawings. The drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of the embodiments may be practiced without some or all of the specific details. In other instances, well-known process operations have not been described in detail in order not to unnecessarily obscure novel aspects. In addition, terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used.

In general, and for the purposes of introducing concepts of embodiments of the present disclosure, aspects encompass methods and systems for automatically extracting headway information from roadside LiDAR trajectory data. Conventional methods typically require the manual extraction of headway information from video information obtained of vehicles, and some methods also use software to assist in generating desired headway information. In contrast, methods disclosed herein obtain headway information from roadside LiDAR trajectory data and then process the trajectory data through, for example, Python Scripts and ArcGIS software. Using the trajectory data, vehicle speed and timestamps can be used to determine the critical headway for vehicles that have stopped at a roadway intersection or stopped before entering a roundabout, and to determine other useful data such as entry capacity at a roundabout.

FIGS. 1A to 1D depict several different types of roadside LiDAR sensor system deployments in accordance with some embodiments. LiDAR sensors use a wide array of infra-red lasers paired with infra-red detectors to measure distances to objects, and there are several companies that manufacture LiDAR sensor products, such as the Velodyne® Company of San Jose, California. The LiDAR sensors are usually securely mounted within a compact, weather-resistant housing and include an array of laser/detector pairs that spin rapidly within the fixed housing to scan the surrounding environment and provide a rich set of three-dimensional (3D) point data in real time. The lasers themselves are commonly used in other applications, for example in barcode scanners in grocery stores and for light shows and are eye-safe (will not damage human eyes). The selection of a particular type of LiDAR sensor to utilize depends on the purpose or application, and thus factors that may be considered include the number of channels (resolution of LiDAR scanning), the vertical field of view (FOV), and the vertical resolution of laser beams. A LIDAR sensor may have anywhere from eight (8) to one-hundred and twenty-eight (128) laser beams that are rotated 360 degrees to measure the surrounding environment in real-time. In general, LiDAR sensors with more laser channels, larger vertical FOV, and higher resolution are more productive in data collection.

FIG. 1A is an example of a permanent LiDAR sensor system installation 100 located at an intersection of roadways. As shown, the LiDAR sensor 102 is affixed to a traffic light pole 104 that includes a traffic light 106. In some implementations, raw sensor data generated by the roadside LiDAR sensor 102 may be transmitted via a wired or wireless connection (not shown), for example, to an edge computer (not shown) and/or to a datacenter that includes one or more server computers (not shown) for processing.

Figure 1B:
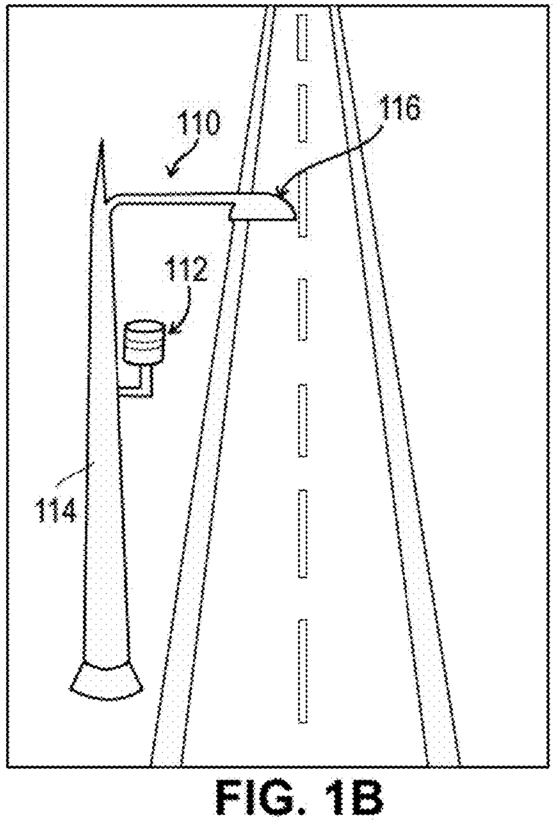
FIG. 1B illustrates another embodiment of a roadside LiDAR sensor system situated alongside a road, or alongside a road segment, in accordance with embodiments of the disclosure.

FIG. 1B illustrates another embodiment of a roadside LiDAR sensor system 110 situated alongside a road, or alongside a road segment, in accordance with the disclosure. The LiDAR sensor 112 is attached to a lamppost 114 that includes a streetlamp 116. Like the LiDAR sensor system 100 of FIG. 1A, in some embodiments the sensor data generated by the roadside LiDAR sensor 112 may be transmitted via a wired or wireless connection (not shown), for example, to an edge computer (not shown) and/or to a datacenter that includes one or more server computers (not shown) for processing.

Figure 1C:
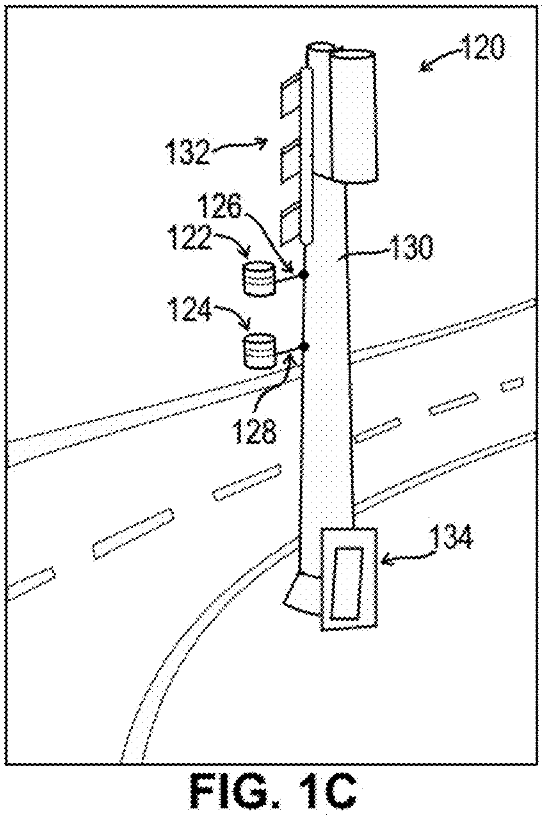
FIG. 1C illustrates a portable roadside LiDAR sensor system located along a road segment in accordance with some embodiments of the disclosure.

FIG. 1C illustrates a portable roadside LiDAR sensor system 120 located along a road segment in accordance with some embodiments. In this implementation, a first LiDAR sensor 122 and a second LiDAR sensor 124 may be removably affixed via connecting arms 126 and 128, respectively, to a traffic light post 130 below a traffic light 132 (or traffic signal head) as shown so as to be reachable for portable system installation and removal. The LiDAR sensor system 120 includes a portable sensor data processing unit 134 containing electronic circuitry (not shown) which may process the data generated by both the roadside LiDAR sensors 122 and 124 on-site and/or may transmit the sensor data and/or the processed data to a datacenter that includes one or more server computers (not shown), which may utilize the sensor data for further processing. The roadside LiDAR sensors assembly (sensors 122, 124 along with the connecting arms 126,128 and data processing unit 134) may be left in place to gather traffic related data for days, weeks or months.

Figure 1D:
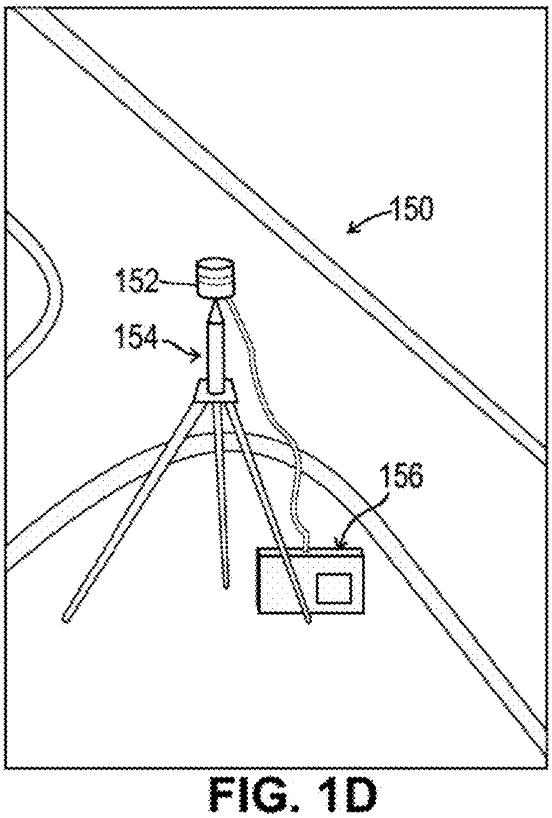
FIG. 1D illustrates another embodiment of a portable roadside LiDAR sensor system which may be located along a road segment in accordance with some embodiments of the disclosure.

FIG. 1D illustrates another embodiment of a portable roadside LiDAR sensor system 150 which may be located along a road segment in accordance with some embodiments. In this implementation, a first LiDAR sensor 152 is supported by a tripod 154 that is placed alongside a road or, for example, in a road median (not shown). The LiDAR sensor system 150 may also include a portable sensor data processing unit 156 which may store and/or process sensor data generated by the roadside LiDAR sensor 152. In some implementations, the LiDAR sensor system 150 is a standalone unit which is left on-site for only short periods of time, such as for a few hours, and then transported to a datacenter or otherwise operably connected to a host computer for processing and/or analyzing the traffic data captured by the roadside LiDAR sensor 152.

Figure 2:
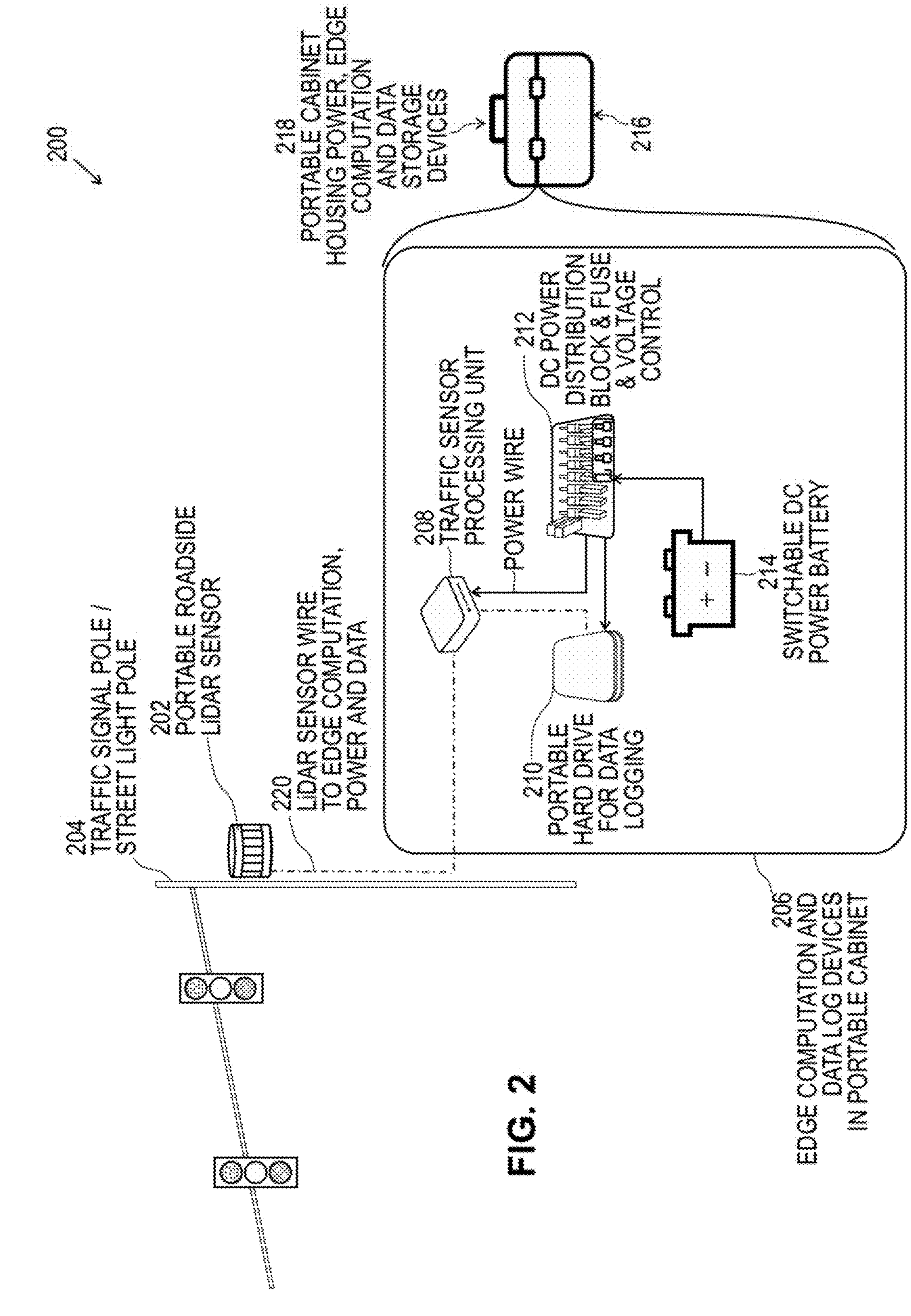
FIG. 2 is a functional diagram illustrating the components of a portable roadside LiDAR sensor system in accordance with some embodiments of the disclosure.

FIG. 2 is a functional diagram 200 illustrating the components of a portable roadside LiDAR sensor system in accordance with some embodiments. A portable roadside LiDAR sensor 202 is affixed to a traffic signal pole 204 (which may also be a streetlight pole). Edge processing circuitry 206 may include a traffic sensor processing unit 208 (or traffic sensor CPU), a portable hard drive 210, power control circuitry 212 and a battery 214 all housed within a hard-shell case 216 having a handle 218. The traffic sensor processing unit or CPU 208 may be a computer or several computers or a plurality of server computers that work together as part of a system to facilitate processing of roadside LiDAR sensor data. In such a system, different portions of the overall processing of such roadside LiDAR sensor data may be provided by one or more computers in communication with one or more other computers such that an appropriate scaling up of computer availability may be provided if and/or when there is a need for greater workloads, for example if a large amount of roadside traffic data is generated and requires processing.

Referring again to FIG. 2, a wired or wireless connection 220 may electronically connect the roadside LiDAR sensor 202 to the edge processing circuitry. In some implementations, the traffic sensor processing unit 208 receives raw traffic data from the roadside LiDAR sensor 202, processes it and stores the processed data in the portable hard drive 210. The power control circuitry 212 is operably connected to the battery 214 and provides power to both the traffic sensor processing unit 208 and the portable hard drive 210. In some implementations, the edge processing circuitry 206 may be physically disconnected from the roadside LiDAR sensor 202 so that the hard-shell case 216 can be transported to a datacenter (not shown) or otherwise operably connected to a host or server computer (not shown) for processing and/or analyzing the traffic data captured by the roadside LiDAR sensor 202.

Figure 3:
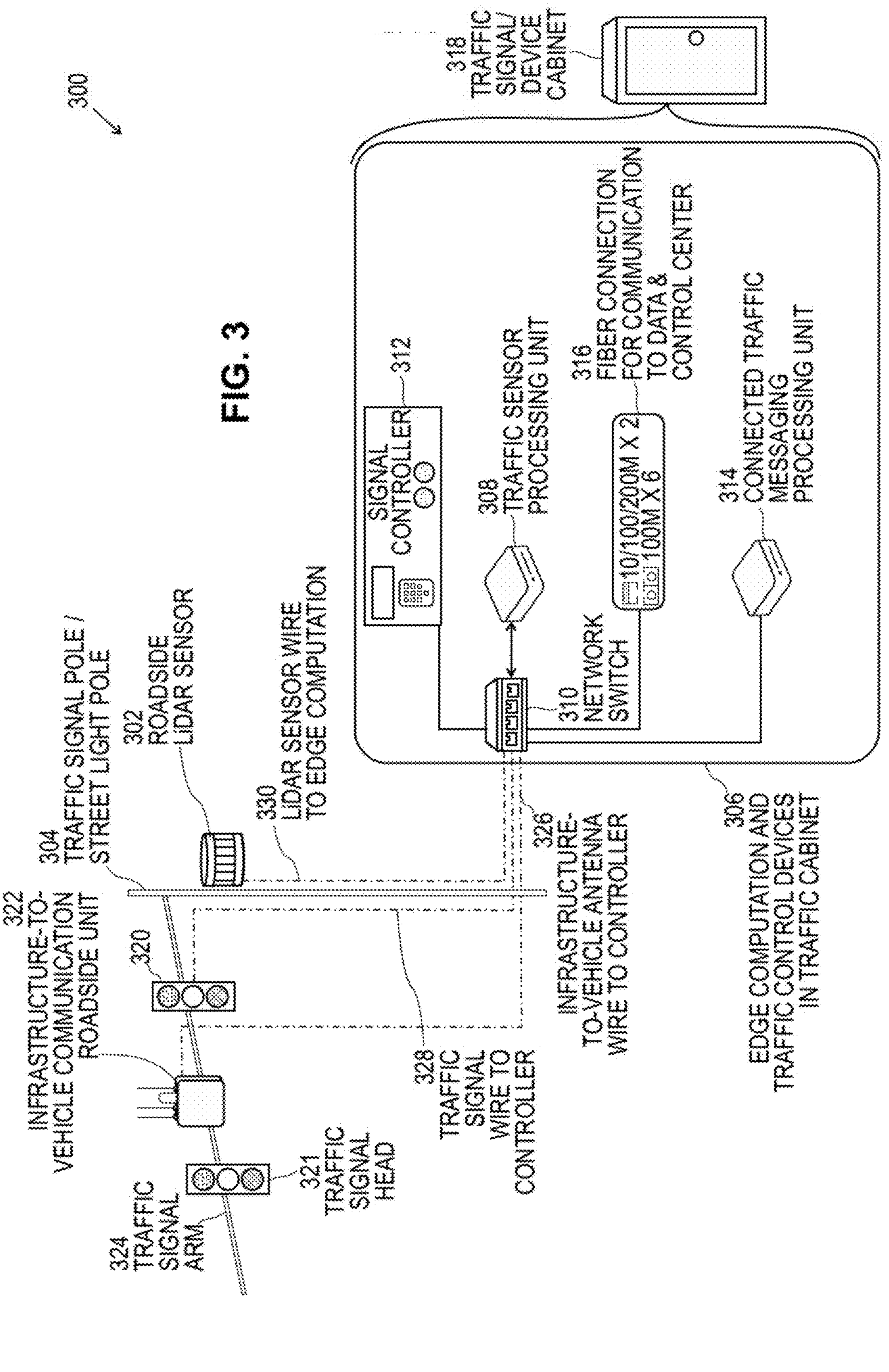
FIG. 3 is a functional diagram illustrating the components of a permanent roadside LiDAR sensor system embodiment in accordance with the disclosure.

FIG. 3 is a functional diagram 300 illustrating the components of a permanent roadside LiDAR sensor system in accordance with some embodiments. A roadside LiDAR sensor 302 is affixed to a traffic signal pole 304 (which may also be a streetlight pole) and is operably connected to edge processing circuitry 306 which may be housed within a roadside traffic signal device cabinet 318. In some embodiments the roadside traffic signal device cabinet 318 is locked and hardened to safeguard the electronic components housed therein against vandalism and/or theft.

Referring again to FIG. 3, in some embodiments the edge processing circuitry 306 includes a network switch 310 that is operably connected to a traffic sensor processing unit 308 (or traffic sensor CPU), to a signal controller 312, to a connected traffic messaging processing unit 314, and to a fiber-optic connector 316 (and in some embodiments to a fiber-optic cable, not shown). In some implementations, in addition to being operably connected to the roadside LiDAR sensor 302, the network switch 310 is also operably connected to the traffic light 320 and to a transmitter 322, which transmitter is operable to function as an infrastructure-to-vehicle roadside communication device. In the illustrated embodiment, the traffic lights 320 and 321, and the transmitter 322, are affixed to a traffic signal arm 324 that is typically positioned so that these devices are arranged over a roadway, typically over an intersection of roadways. In some implementations, the transmitter 322, the traffic light 320, and the roadside LiDAR sensor 302 are electrically connected to the network switch 310 via wires or cables 326, 328 and 330, respectively. In other implementations, these devices may instead be wirelessly connected to the network switch 310. In some embodiments, the traffic sensor processing unit 308 receives raw traffic data from the roadside LiDAR sensor 302, processes it and operates with the connected traffic messaging processing unit 314 and transmitter 322 to transmit data and/or instructions to a connected vehicle (CV) which may be traveling on the road and approaching the intersection. In addition, the traffic sensor processing unit 308 may transmit data via the fiberoptic connector 316 to a remote data and control center (not shown) for further processing and/or analysis.

The roadside LiDAR sensing systems described above with reference to FIGS. 1A through 1D, FIG. 2 and FIG. 3 may provide behavior-level, multimodal trajectory data of all traffic users, including but not limited to cars, buses, trucks, motorcycles, bicycles, wheelchair users, pedestrians, pets and wildlife. Such real-time, all-traffic trajectories data can be gathered for extended distances and this critical information may be transmitted, in some implementations to real-time to connected and/or autonomous vehicles. Such operation permits autonomous vehicles traveling into the area covered by such a roadside LiDAR sensor system to be aware of potential upcoming collision risks and to be aware of the movement status of other road users while still being at a distance away from the area.

Embodiments disclosed herein concern data collection and data preparation steps involving systems and methods for extracting headway data to monitor the traffic flow of vehicles, pedestrians and/or other objects or animals. Although some of the descriptions, disclosures and examples discussed below are in the context of extracting headway data from raw LiDAR sensor data obtained by a LiDAR sensor data system positioned near a roundabout, it should be understood that the same or similar data could be obtained from roadway intersections which require vehicles to stop and/or yield to traffic before proceeding. As mentioned above, roundabouts are circular roadway intersections with yield-controlled entry points to a circular lane or lanes that permit an uninterrupted flow of traffic around a central island (which vehicle flow is counterclockwise in the United States, but may be clockwise in other countries such as the United Kingdom).

Some descriptive terms used herein will now be explained. For example, the word "capacity" represents the maximum sustainable hourly flow rate at which vehicles (or drivers) reasonably can be expected to traverse a point or a uniform segment of a lane or roadway during a given time period under prevailing roadway, environmental, traffic, and control conditions. There have been many proposed methods for computing capacity at roundabouts either using regression models or analytic models. However, as mentioned above the traffic engineering industry utilizes the Highway Capacity Manual (HCM) as a guide to measuring capacity. The HCM is also utilized to obtain information concerning other performance measures such as level of service (LOS), delay, queue, and volume-to-capacity ratio. For roundabouts, the HCM employs a combination of regression and analytic models to derive a relationship between conflicting traffic flow and capacity of entry flow. Regarding roundabouts, the conflicting traffic flow is the circulating flow, and the entry capacity is that which exists at the entry lanes of a roundabout leg. As one would expect, the entry capacity decreases as the conflicting circular flow of vehicles increases and thus the analytic model that the HCM employs is based on the gap acceptance theory.

Figure 4A:
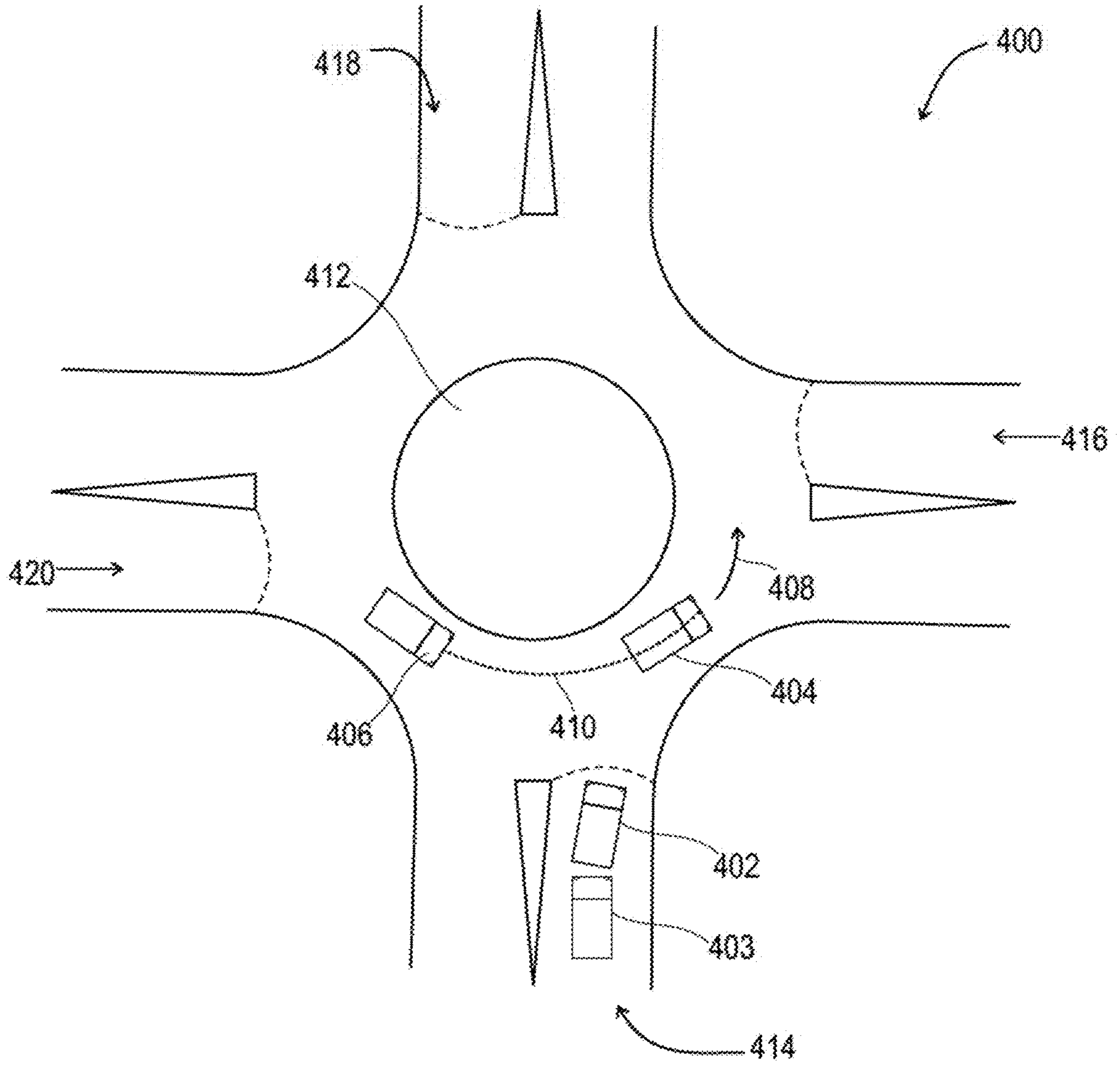
FIG. 4A is an overhead graphical illustration of a roundabout to illustrate the Gap acceptance theory which may be applied to data concerning circular intersections.

FIG. 4A is an overhead graphical illustration of a roundabout 400 to illustrate the Gap acceptance theory which is a useful model for explaining circular intersections commonly known as roundabouts. As shown, a minor stream vehicle 402 is stationary (not moving) at an entry point of an entry lane 414 of the roundabout 400. In FIG. 4A there is also a second vehicle 403 stopped directly behind the minor stream vehicle 403. A first moving vehicle 404 and a second moving vehicle 406 are moving at a particular speed in the direction of arrow 408 within a major stream of traffic about the central island 412. In order to enter the major stream of traffic, the driver of the minor stream vehicle 402 needs to decide if the gap or headway 410 between the first moving vehicle 404 and the second moving vehicle 406 (which can also be viewed as the time difference between the vehicles 404 and 406) is large enough to safely enter the major stream of traffic traveling around the central island 412 in the direction of the arrow 408. Thus, the moving vehicles 404 and 406 are traveling in a counterclockwise direction (as depicted by arrow 408) at some speed and the drivers of stationary vehicles 402 and 403 must each determine when it is safe to proceed to enter the flow of traffic around the center island 412.

In the case of roundabouts, a minor stream of traffic refers to the entry lane(s) 414, 416, 418 and 420 which may be yield-controlled (meaning that there is a "Yield" sign posted which each driver must abide by before proceeding into the major stream of traffic). The term "major stream of traffic" refers to one or more of the circulatory lanes within the roundabout (the number and size of which depends on how large the roundabout is). The term "minor stream driver" is associated with the "decision vehicle" 402 that is being driven by a "decision driver." The headway 410 (or leeway) is the distance between consecutive vehicles which the decision driver in the decision vehicle 402 is willing to accept regarding his or her decision to enter the major stream flow of traffic between those vehicles. The headway 410 is a function of many factors and thus will vary from driver to driver. For example, the decision to enter the headway may depend on the decision vehicle driver's experience, environmental factors such as rain or fog, the geometric design of the roundabout, the speed of the vehicles in the major stream, the traffic volume (number of vehicles circling the central island 412), and/or other factors (for example, the acceleration power of the decision vehicle 402 or of any other vehicle).

The tendency for the decision driver in the vehicle 402 to either reject or accept a headway is captured by measuring the "critical headway" which is defined as the minimum time (or distance) between two successive major stream vehicles (such as vehicles 404 and 406) for which the decision driver of the decision vehicle 402 can make a maneuver to enter the major stream of traffic. Although the critical headway is one of the gap acceptance parameters used by analysts it should be understood that the critical headway cannot be generalized because each vehicle driver is different, and therefore the critical headway will vary from driver to driver.

Figure 4B:
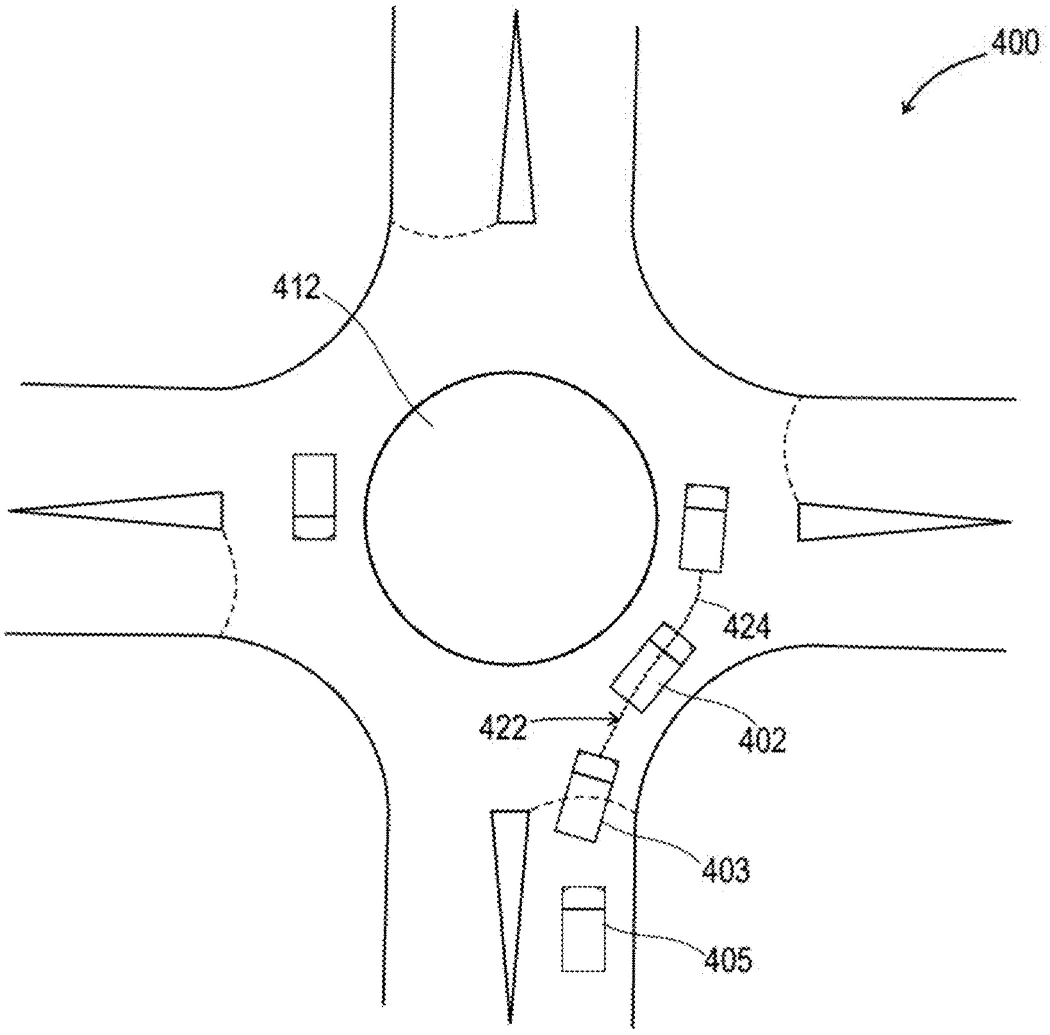
FIG. 4B is the same overhead graphical illustration of a roundabout of FIG. 4A but now illustrating a second gap acceptance parameter.

FIG. 4B depicts the same overhead view of the roundabout 400 of FIG. 4A but is now being used to illustrate a second gap acceptance parameter known as the "follow-up headway" 422, which can be defined as the time headway between the departure of a first minor stream vehicle 402 and the departure of a subsequent minor stream vehicle 403 into the major stream of traffic under the condition of continuous queueing. As shown, the gap 424 of the first minor stream vehicle 402 has the same time difference as the follow-up headway 422 of the subsequent minor stream vehicle 403. The Highway Capacity Manual (HCM) determines gap acceptance parameters based on field data obtained from roundabouts located across the United States and then derives a capacity equation that is a function of the conflicting vehicle flow.

Figure 4C:
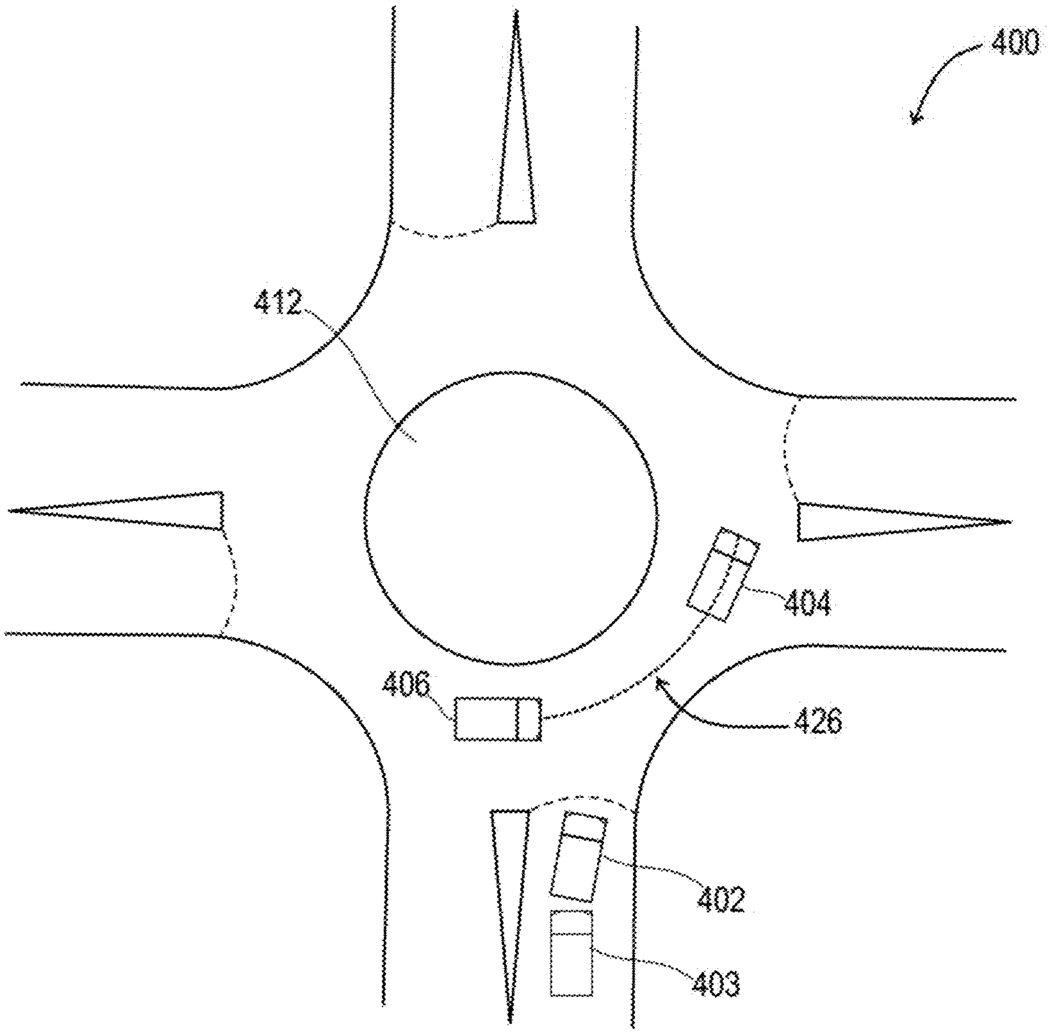
FIG. 4C is the same overhead graphical illustration of a roundabout of FIGS. 4A and 4B but now being used to illustrates a “rejected headway” parameter.

FIG. 4C depicts the same overhead view of the roundabout 400 of FIGS. 4A and 4B but is now being used to illustrate the concept of a "rejected headway" 426. The rejected headway 426 is the distance between a first major stream vehicle 404 and a successive second major stream vehicle 406 for which the driver of the minor stream decision vehicle 402 decides not to enter the major stream. Such rejected headways must be determined from field data because each vehicle driver is different, and therefore the rejected headway (just like the critical headway described above) will vary from one vehicle driver to another vehicle driver.

Figure 4D:
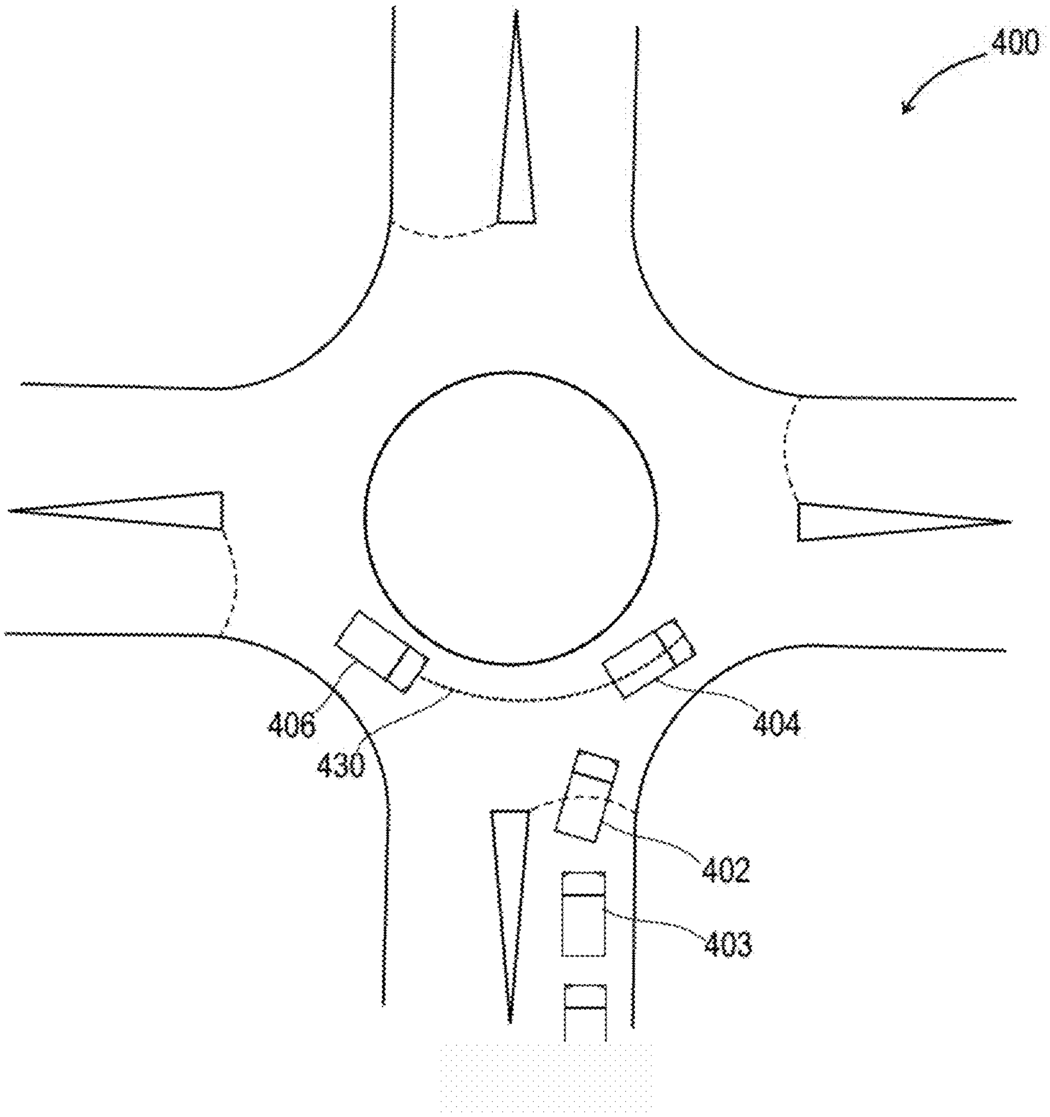
FIG. 4D is the same overhead graphical illustration of a roundabout of FIGS. 4A-4C but now being used to illustrate an “accepted headway” parameter.

FIG. 4D depicts the same overhead view of a roundabout 400 of FIGS. 4A-4C but is now being used to illustrate the concept of an "accepted headway" 430. In particular, an accepted headway 430 is defined as the major stream headway between a first vehicle 404 and a second successive vehicle 406 for which the driver of a minor stream decision vehicle 402 decides is long enough (or safe enough) to enter the major stream. Both the "rejected headway" data and the "accepted headway" data are ripe for further analysis through use of collected field data. Therefore, many data points of such rejected headways 426 and accepted headways 430 need to be collected, and further analysis conducted to extract what can be generally accepted as being the critical headway.

Many methods have been developed to help determine a generalization for the critical headway such as "Raff's Method," the "Maximum Likelihood Method," the "Probability Equilibrium Method," and the like. The two most commonly used methods, however, are Raff's Method and the Maximum Likelihood Method. Raff's Method may advantageously be employed due to its case of computation. The second gap acceptance parameter or the "follow-up headway," which was defined above as the time between the departure of a first minor stream vehicle and the departure of a subsequent second minor stream vehicle into the major stream while continuously queueing, may be calculated by taking the average of the field-measured follow-up headways.

Once the critical headway and the follow-up headway parameters (the gap acceptance parameters) are determined, they can be used to calibrate the HCM 2016 capacity equation. It has been observed that there is a variability between states and cities in gap acceptance parameter results, and thus the HCM includes a method for calibrating the capacity equation for more accurate measurement of roundabout capacity at certain states, cities, and even at specific roundabouts and specific roundabout legs. For example, the State of Nevada has its own capacity equation.

As mentioned above, many research or government studies of gap acceptance for roundabouts have been conducted by using video data, manually extracting data and then by using software. Some of the challenges of these studies include the use of multiple cameras to capture the areas of interest, typically using two cameras. In contrast, roadside LiDAR data is much less computationally demanding and provides a 360-degree detection range which makes it easier to outfit at an intersection as opposed to placing several cameras at the intersection. Moreover, LiDAR data is not limited by the lighting conditions. Because of these advantages, a roadside LiDAR sensor can provide data over a wider detection range for greater periods of time.

In some embodiments, a method includes data pre-processing of roadside LiDAR data, next extracting roadside LiDAR trajectory headway data, then performing a critical headway calculation, and next conducting a Highway Capacity Manual (HCM) capacity calibration. Described below is a step-by-step procedure for processing the raw LiDAR data to extract trajectory data of all road users. The roadside LiDAR trajectory headway extraction outlines a new methodology for extracting the gap acceptance headways. In some embodiments, these values are then used to apply Raff's method for determining the critical headway and to calibrate the HCM capacity equation.

Some key terminology utilized herein includes the terms lag, gap, and headway as explained above. Specifically, a "headway" is the time difference between a second vehicle following a lead vehicle measured from the front bumper of the lead vehicle to the front bumper of the following, second vehicle. A "gap" is the time difference between a second vehicle following a lead vehicle measured from the back bumper of the lead vehicle to the front bumper of the second vehicle, and a "lag" is the time difference between a vehicle entering a roundabout at a yield line and the next circulating vehicle arriving at a conflict zone between the entering vehicle and the circulating vehicle.

Since the derivation of the gap acceptance theory, there has been some confusion in the field as to what should be measured for the critical gap and/or for the critical headway.

The definition that has been adopted in the HCM in recent editions has been the critical headway, and therefore that terminology has been adopted and used herein and is what will be measured. (However, it should be understood that the terms "critical gap" and "critical headway" are used interchangeably in the literature.)

Accordingly, presented herein is a methodology for extracting headway information from LiDAR trajectory data received from a roadside LiDAR sensor system. The process includes pre-processing roadside LiDAR data, next using a methodology for extracting headway information, and then extracting the critical headway, which elements are discussed in detail below. In addition, presented is a method for calibrating the HCM capacity equation.

Figure 5A:
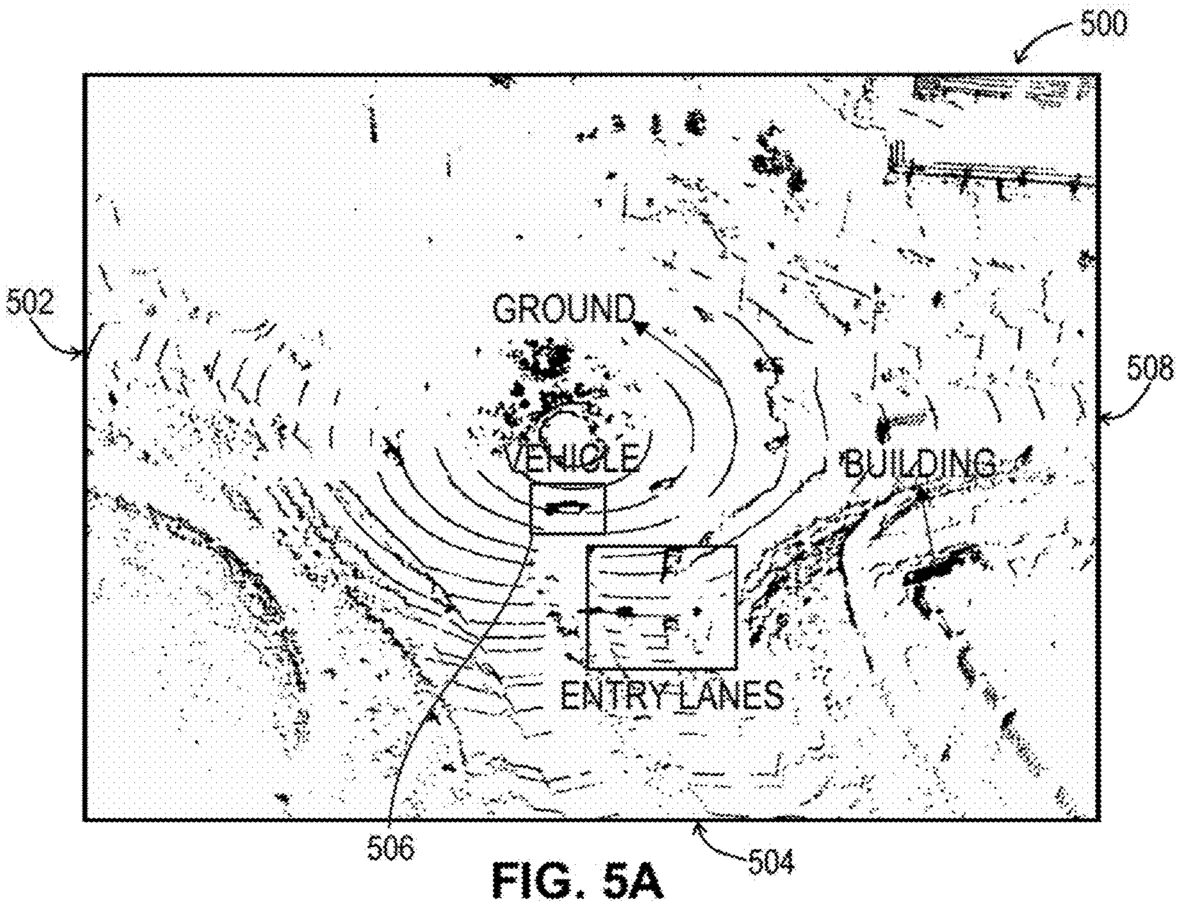
FIG. 5A is a top view plot of raw roadside LiDAR sensor data of a roundabout in accordance with some embodiments of the disclosure.

FIG. 5A is a top view plot screen shot depiction 500 of raw roadside LiDAR sensor data displayed on a display screen of a roundabout 502. Referring to FIG. 5A, depicted are an entry lane 504, a vehicle 506 within the major stream of the roundabout, and a building 508. In some embodiments, the raw roadside LiDAR sensor data is supplied by a roadside LiDAR sensor system (not shown) that includes a data logging unit (which may be a laptop) operably connected to an external hard drive, a battery for powering the data logging unit (which may also include an auxiliary battery), and a 32-channel Velodyne LiDAR sensor (for example, see FIG. 1D). In the example shown in FIG. 5A, raw roadside LiDAR sensor data is stored in 30-minute ".pcap" files on the external hard drive, and the raw LiDAR data can be seen on a display of the laptop by a user utilizing Veloview™ software (as shown).

Figure 5B:
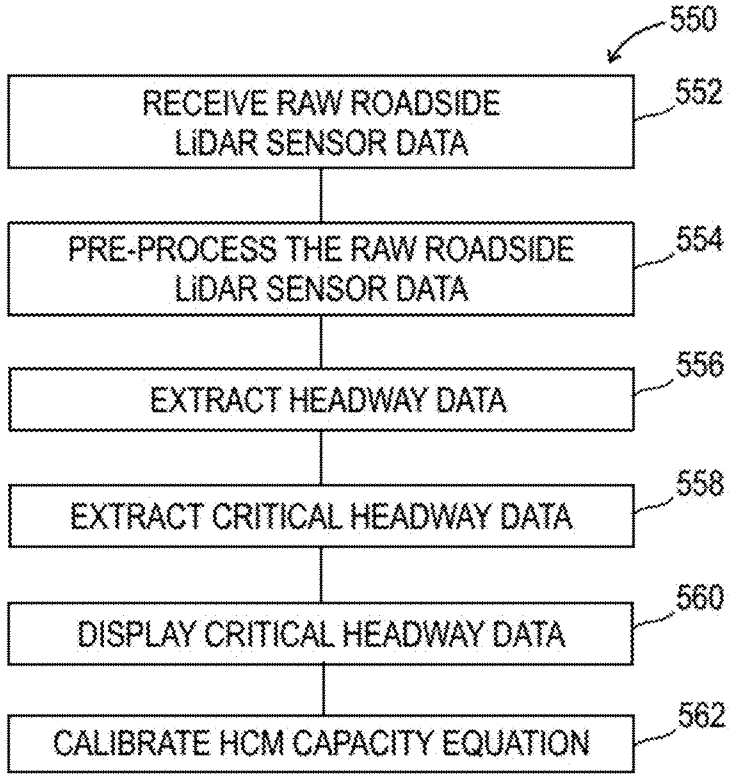
FIG. 5B is a flowchart of a method for extracting headway information from LiDAR trajectory data in accordance with some embodiments of the disclosure.

FIG. 5B is a flowchart 550 of a method for extracting headway information from LiDAR trajectory data in accordance with some embodiments. In particular, a LiDAR data processor of a roadside LiDAR sensor system receives 552 raw roadside LiDAR sensor data of a roadway, such as a roundabout. The LiDAR data processor next pre-processes 554 the raw LiDAR sensor data. Such pre-processing is utilized to obtain trajectory information of all road users which may include, for example, passenger vehicles, trucks, bicycles, pedestrians, and animals (such as wild horses and coyotes). Such pre-processing may include background filtering, object clustering, object classification, real-time tracking of movement, and data mapping.

Referring again to FIG. 5B, after pre-processing the LiDAR data processor extracts 556 headway data, and then extracts 558 critical headway data. In some implementations, the LiDAR data processor then displays 560 the critical headway data on a display screen to a user, and in some implementations may also calibrate 562 the HCM capacity equation.

Concerning background filtering, the Raw LiDAR sensor data 500 depicted by FIG. 5A includes cloud points of all static features such as trees, bushes, buildings, road signs, the ground and the like. Thus, it is important to filter out the background data to increase the accuracy of object detection and classification, and to reduce the computational cost. In some embodiments, background filtering is performed by first aggregating multiple LiDAR sensor data frames and dividing the points into small and continuous three-dimensional (3D) cubes. The laser points contained in a 3D cube are identified as background cloud points if the number of laser points is greater than an automatically learned threshold. The background 3D cubes are used to identify the background laser points, and then the background laser points are excluded. The threshold laser point value depends on the distance the 3D cube is from the LIDAR sensor.

The purpose of clustering objects is to categorize road users based on similarities of laser points. These similarities can be the centroid, density, connectivity, and distribution of a cluster. In some implementations, the method employed for clustering objects is the density-based spatial clustering application with noise (DBSCAN), which divides the dataset into core points, border points, and noise points within a predefined searching radius. If the number of data points within the searching radius is greater than a predefined minimum number of points, the data points will be clustered into an object. However, the searching radius and minimum points parameters must be adjusted based on the road user type (vehicle vs. pedestrian), distance from the LiDAR sensor (closer cluster will have higher resolution), and the angle of the LiDAR laser beam. In some embodiments, an adaptive DBSCAN clustering algorithm can be used.

Once the background has been filtered, the reference points of each road user are defined to track the clusters and extract trajectory information. For pedestrians, the mean center of each cluster may be used as the reference point. For vehicles, the reference point is defined as the closest corner of the cluster to the LiDAR sensor as it provides the most accurate results. For instance, a vehicle traveling away from the sensor may use the back corner closest to it, while a vehicle traveling towards the sensor may use the front corner closest to it.

There are several road users such as vehicles, pedestrians, and bicycles that utilize the roadway simultaneously. Therefore, it is critical to classify the previously clustered objects into the correct road user type. The total number of cloud points, 2D distance, and direction of the clustered point distribution are extracted from the object clustering process to classify the clustered objects. Using these three parameters, a backpropagation artificial neural network (BP-ANN) was developed to train for the classification of the clusters.

Next, with clustered objects classified, object tracking is performed to extract trajectory and speed information of the road users. Tracking is to identify the same object over continuous data frames, and two factors are considered for object tracking. The first is the distance from one object in the previous frame to all objects in the current frame, and the second is the time difference between the two frames. The object in the current frame that is the closest to the object in the previous frame is the match of the two objects. The distance threshold is based on the speed limit. If the current object cannot be matched to a previous object, a new object ID is assigned to that object. Each road user has its own unique object identifier (ID).

Once vehicle trajectories have been obtained, the next step is to map the data (data mapping) so the data is georeferenced and can be uploaded into the ArcGIS program for further analysis. The coordinate system for raw LiDAR data is a cartesian coordinate system with the LiDAR sensor as the origin. In some implementations, a mapping method for roadside LiDAR data is used that converts the LiDAR coordinate system to the WGS-84 coordinate system. The method requires at least four reference points of LiDAR cartesian points and corresponding geographic coordinates to be collected by a Global Positioning System (GPS) unit or extracted from a GIS platform such as ArcGIS Pro™ or Google Earth™. Next, a transformation matrix is derived and used to convert the roadside LiDAR sensor data. This is an essential step for extracting the desired headway and speed information.

With the georeferenced trajectory of all road users obtained in the data preprocessing stage, the volume, speed, and trajectories can be extracted for specified detection zones for further analysis. In one implementation, geolocated trajectory data is first converted to GIS feature classes every 30 minutes. Next, ArcGIS is utilized so that the detection zones can be drawn for the entry lanes and conflicting circulatory lanes using the draw command and converting the drawings into feature classes. Next, in an implementation an ArcGIS plugin of python scripts is run to determine the volume, direction, size, and speed of each road user for each detection zone.

Figure 6:
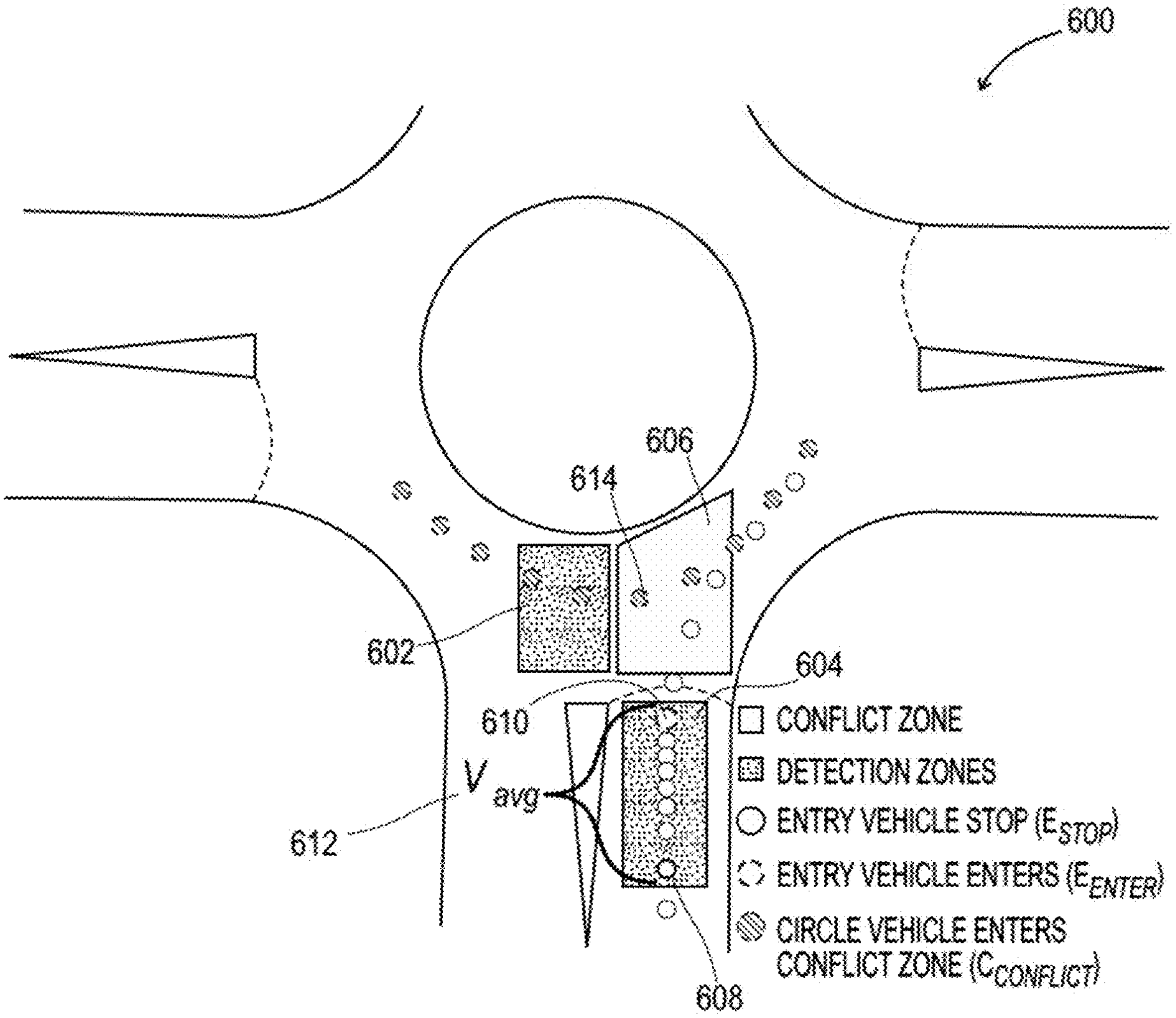
FIG. 6 a schematic top view diagram of a roundabout to illustrate various features in accordance with the disclosure.

FIG. 6 a schematic top view diagram of a roundabout 600 to illustrate various features in accordance with the disclosure. As shown in FIG. 6, there is a first detection zone 602, a second detection zone 604 and a conflict zone 606. From the output obtained by running the python script, desired inputs for headway extraction are shown in FIG. 6 as follows:

- Entry Vehicle Stop ($E_{stop}$) 608: Timestamp for which the entry vehicle comes to a stop.
- Entry Vehicle Enters ($E_{enter}$) 610: Timestamp for which the entry vehicle accepts the headway.
- Entry Average Speed ($V_{avg}$) 612: Average speed of entry vehicle trajectory points in the detection zone.
- Circle Vehicle Enters Conflict Zone ($C_{conflict}$) 614: Timestamp for which the circulating vehicle arrives at the conflict zone.

The data inputs outlined in FIG. 6 are used to determine the following:

- Rejected lag: the time difference between an entry vehicle arriving at the yield line and a circulating vehicle arriving at the conflict zone for which the entry vehicles rejects entry into the roundabout.
- Accepted lag: the time difference between an entry vehicle arriving at the yield line and a circulating vehicle arriving at the conflict zone for which the entry vehicles accepts entry into the roundabout (it does enter).
- Rejected Headway: the time difference between a second vehicle following a lead vehicle measured from the front bumper of the lead vehicle to the front bumper of the following, second vehicle for which a corresponding entry vehicle rejects entry into the roundabout.
- Accepted Headway: the time difference between a second vehicle following a lead vehicle measured from the front bumper of the lead vehicle to the front bumper of the second, following vehicle for which a corresponding entry vehicle accepts entry into the roundabout.
- Follow-up Headway: The time headway between queued entry vehicles utilizing the same headway in the conflicting circulatory flow.

Concerning a rejected lag, if an entry vehicle 608 does not enter the roundabout before a vehicle circulating within the roundabout enters the conflict zone 606 then the time difference between when the entry vehicle comes to a full stop and the next vehicle circulating within the roundabout enters the conflict zone is recorded as the rejected lag. Although this value is not used herein it may be used for further analysis in future implementations. Furthermore, it is essential to differentiate between rejected lags and rejected headways because the rejected headways are major stream headways that are observed by the minor stream decision vehicle whereas rejected lags are not.

Concerning a rejected headway and referring to FIG. 6, in an implementation when an entry vehicle remains in the detection zones 602 and 604 while two or more vehicles in the circulatory lane(s) of the roundabout pass the conflict zone 606, then the corresponding circulatory headways are extracted and set as rejected headways. Alternatively, when the maximum frame index for the entry vehicle is in between two circulatory maximum frame indices, then the entry vehicle entered the circulatory stream and the corresponding circulatory headway is recorded as an accepted headway.

Figure 7:
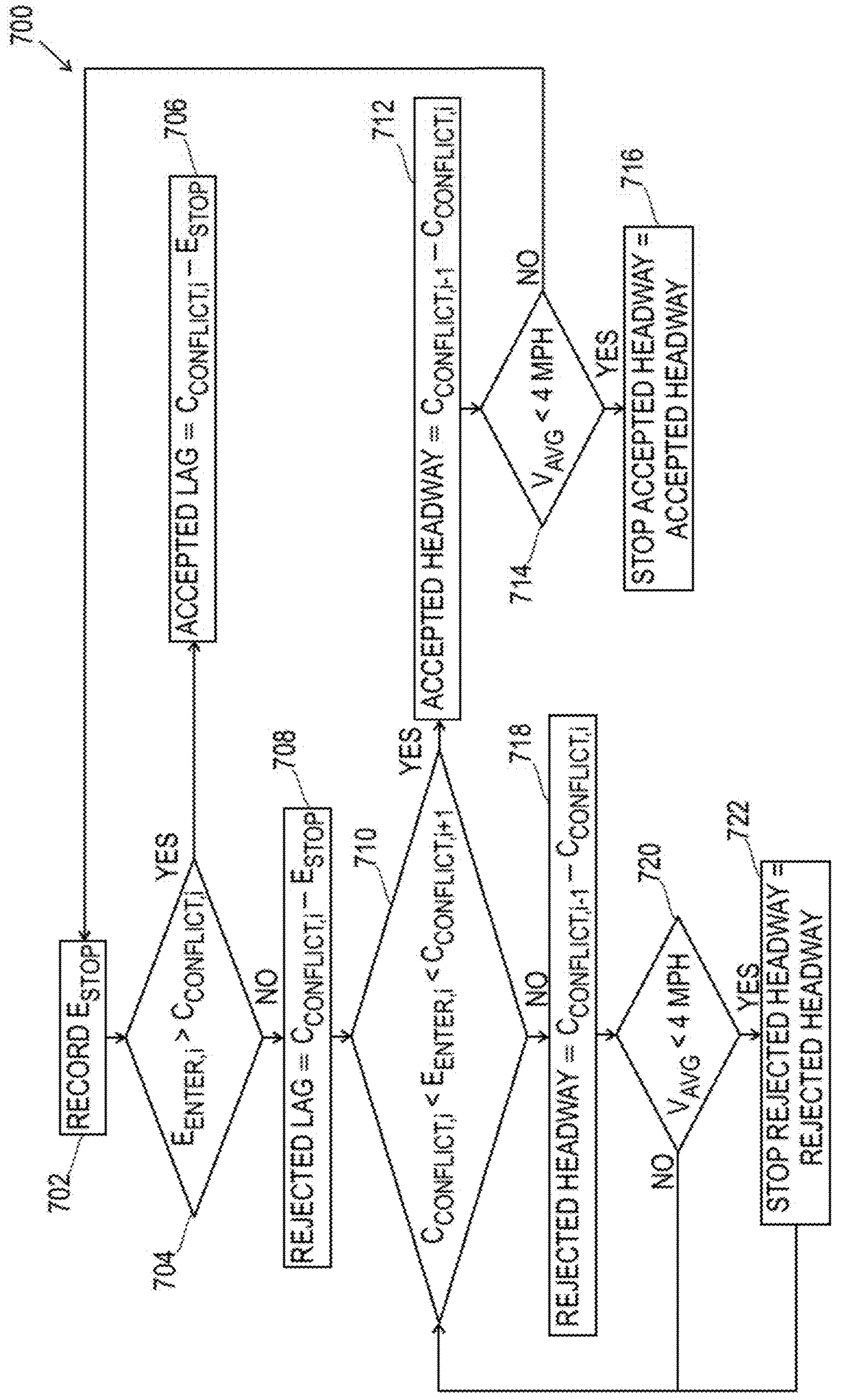
FIG. 7 is a flowchart of a method for extracting accepted lags data, rejected lags data, accepted headway data and rejected headway data in accordance with some embodiments of the disclosure.

FIG. 7 is a flowchart of a method 700 for extracting accepted lags data, rejected lags data, accepted headway data, and rejected headway data in accordance with the disclosure. In step 702 a timestamp is recorded for an Entry Vehicle Stop ($E_{stop}$) when the first entry vehicle comes to a stop at an entry point, for example, to a roundabout. Next, in step 704 if a timestamp for which the entry vehicle accepts the Headway ($E_{enter,i}$), which means the vehicle enters the roundabout, is greater than a timestamp for which the Circulating Vehicle Enters the Conflict Zone ($C_{conflict,i}$) then the Accepted Lag 706 is equal to $C_{conflict,i}-E_{stop}$ and the process then loops back to track the next entry vehicle.

However, in step 704 if the entry vehicle has not entered the roundabout (which means $E_{enter,i}$ is not greater than $C_{conflict,i}$) then the Rejected Lag 708 is equal to $C_{conflict,i}-E_{stop}$ and the process continues to step 710. In step 710, a determination is made whether $E_{enter,i}$ is greater than the initial conflict $C_{conflict,i}$ but less than the next conflict $C_{conflict\ i+1}$ and if so, then the Accepted Headway 712 is equal to $C_{conflict\ i+1}-C_{conflict,i}$. Next, if the average speed of the entry vehicle in the detection zone ($V_{avg}$) is not less than four miles per hour (4 mph) then the process loops back to step 702. However, if $V_{avg}$ is greater than 4 mph 716 then that speed is recorded as the accepted Headway for the vehicle. Accordingly, a 4 mph threshold is used to determine whether a minor flow vehicle stopped or not.

Returning to step 710 in FIG. 7, if $E_{enter,i}$ is not greater than the initial conflict $C_{conflict,i}$ and less than the next conflict $C_{conflict}$ i+1 then the Rejected Headway 718 is equal to $C_{conflict\ i-1}-C_{conflict,i}$. Next in step 720, if $V_{avg}$ is less than 4 mph then the Stop Rejected Headway is equal to the Rejected Headway 722. But if $V_{avg}$ is greater than 4 mph then the process loops back to step 710.

Thus, the follow-up headway data is determined by measuring the headway of queued entry vehicles that enter the same circulating headway when the lead vehicle comes to a stop. Once the maximum frame index for the entering vehicle is recorded, the headway of the following queued vehicles is recorded. In some implementations, the maximum threshold is defined as 5 seconds to ensure that only vehicles in the queue are recorded. The measurement is stopped once a new circulatory vehicle approaches the conflict zone or the entry headway exceeds 5 seconds.

Once the Rejected Headways data and the Accepted Headways data are extracted from the observed vehicle data, a Critical Headway value may then be determined.

Figure 8:
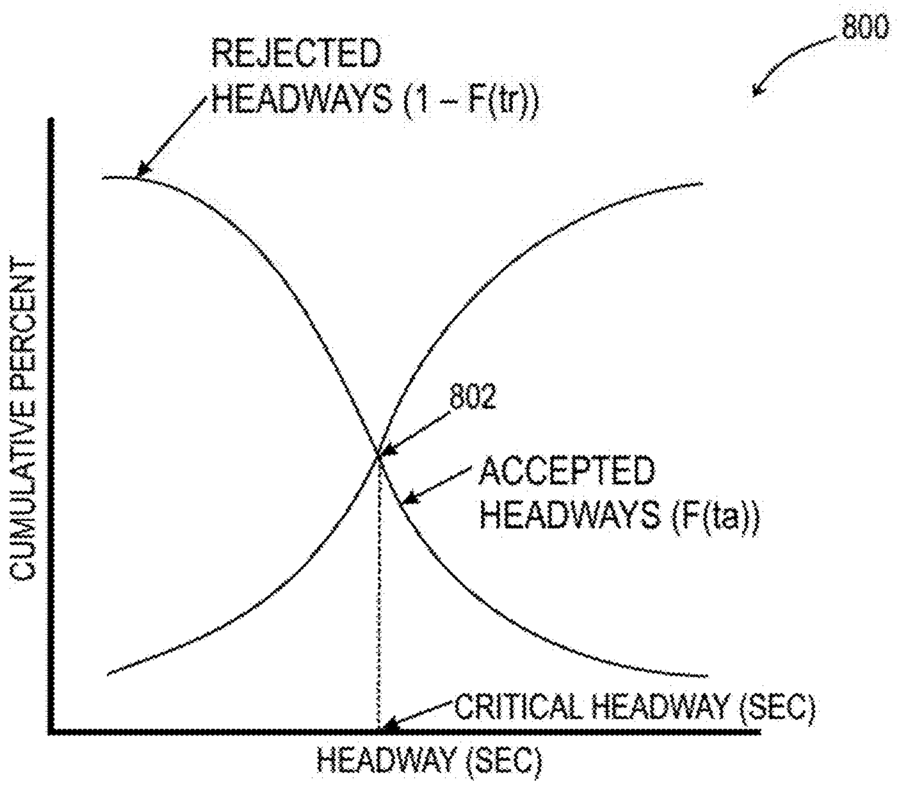
FIG. 8 is a graphical depiction of Raff's Method 800 which can be used in some embodiments to determine the “Critical Headway” in accordance with some embodiments of the disclosure.

FIG. 8 is a graphical depiction of Raff's Method 800 which can be used in some embodiments to determine the "Critical Headway." Raff's Method determines the Critical Headway by finding the point of intersection 802 of the curves representing plots of the rejected headways and the accepted headways as shown in FIG. 8, which point of intersection is found between the following cumulative distribution functions:

$$1-F(t_r) \text{ and } F(t_a) \tag{1}$$

Where:

$t_r$=rejected headway $t_a$=accepted headway

F=cumulative distribution Function

Equations (2)-(4) below outline the HCM calibration equations based on the inputs of Critical Headway, Follow-up Headway, and Conflicting Flow.

$$C = Ae^{-Bv_c} \quad (2)$$

$$A = \frac{3600}{t_f} \quad (3)$$

$$B = \frac{t_c - \left(\frac{t_f}{2}\right)}{3600} \quad (4)$$

Figure 9A:
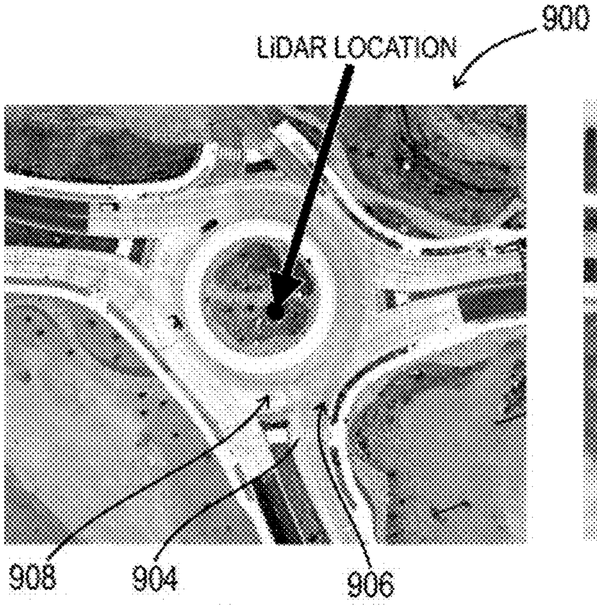
FIG. 9A is an aerial view of a roundabout and includes an indication of the location of a roadside LiDAR sensor in accordance with some embodiments of the disclosure.
Figure 9B:
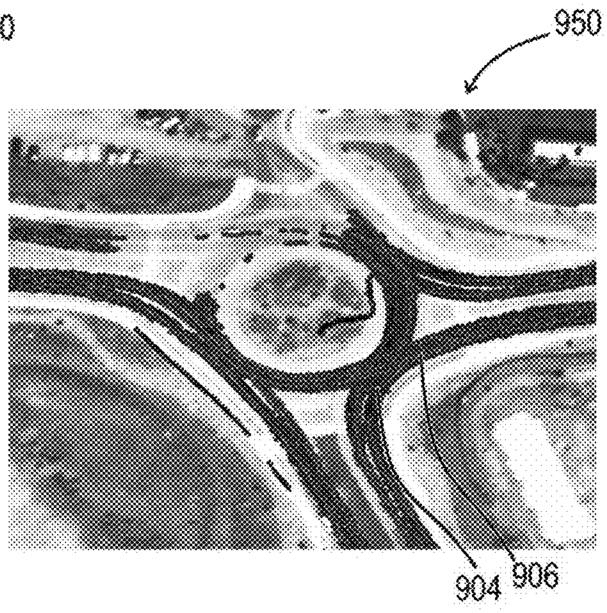
FIG. 9B shows georeferenced LiDAR sensor trajectory data results of multiple vehicles passing through the roundabout of FIG. 9A in accordance with some embodiments of the disclosure.

Where;

C=lane capacity, passenger cars (pc)/hr $v_c$=conflicting flow, pc/hr $t_c$=critical headway, seconds $t_f$=follow-up Headway, seconds A case study was conducted at a roundabout located in a South Reno, Nevada residential area and FIG. 9A is an aerial view 900 of that roundabout. FIG. 9A includes an indication of the location of the roadside LiDAR sensor 902. FIG. 9B shows georeferenced LiDAR sensor trajectory data results 950 of multiple vehicles passing through the roundabout. In the case study, only data concerning the south leg was considered, which consists of a first entry lane 904 and a second entry lane 906 that are yield controlled with a left lane, or inner lane, being a designated left-turn lane, and a right lane, or outer lane, being a designated left-through-right lane. There is one corresponding conflicting lane 908, or circulatory lane, that is a designated through-left lane. Each entry lane was considered separately with critical headway, follow-up headway, and capacity equations being determined. Vehicle trajectory data was collected at the roundabout using the roadside LiDAR sensor. Specifically, roadside LiDAR sensor data collection took place on a Sunday from 9:00 AM-9:00 PM with a 7-minute gap taking place from 3:00 PM-3:07 PM. The traffic at this intersection was homogeneous and there were only eleven (11) pedestrians present during the full day on a south leg crosswalk. Thus, heavy vehicle traffic and pedestrian factors were not considered.

The results and analysis of the data extraction are shown in Table 3 below. The rejected, accepted, and follow-up headways were recorded for the full 12-hour period and the total number of rejected, accepted, and follow-up headways for the inner lane and outer lane were recorded. Since there were higher traffic volumes for the outer entry lane, a greater number of headways was expected for the outer lane.

TABLE 3

Total Number of Rejected, Accepted, and Follow-up Headways

| | Number of Headways Extracted | |
|---|---|---|
| Headway Type | Inner | Outer |
| Rejected Headways | 270 | 320 |
| Accepted Headways | 144 | 190 |
| Follow-up Headways | 79 | 204 |

Concerning gap acceptance parameters for each entry lane, the first gap acceptance parameter is the critical headway. Raff's Method was then used for determining this critical headway value because of its ease of computation.

Figure 10A:
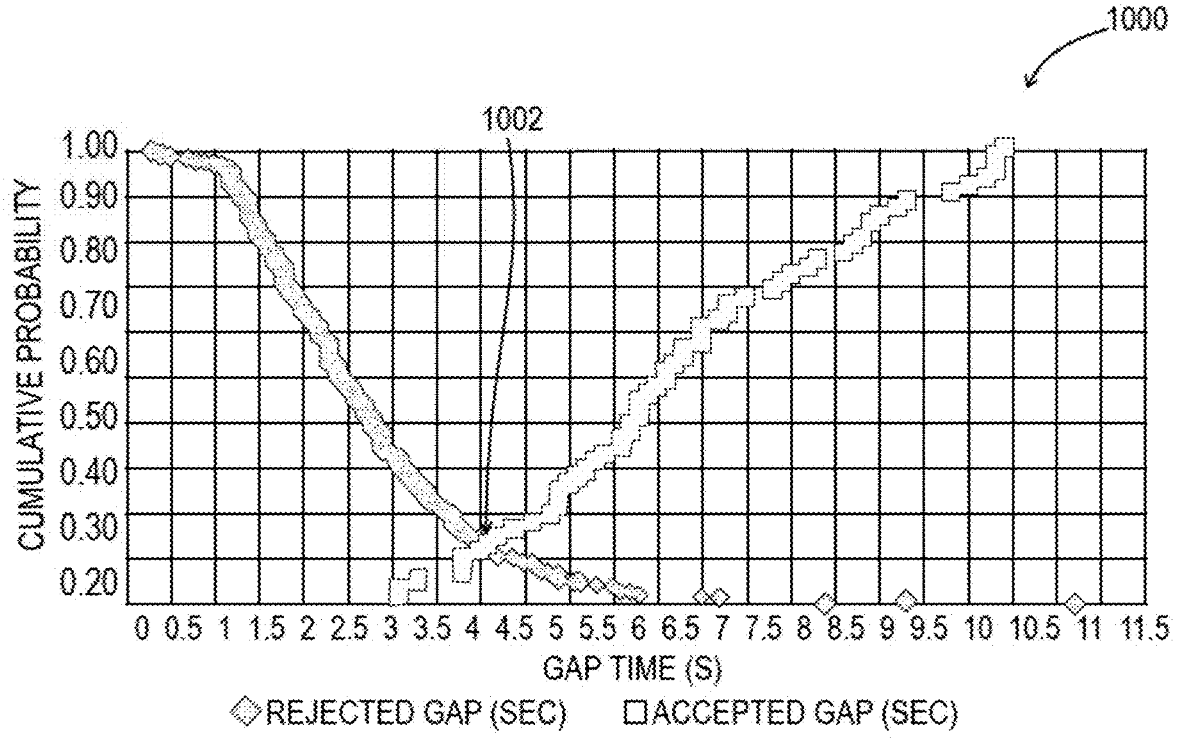
FIG. 10A is a cumulative distribution for an inner lane of a roundabout using Raff's method according to some embodiments of the disclosure.
Figure 10B:
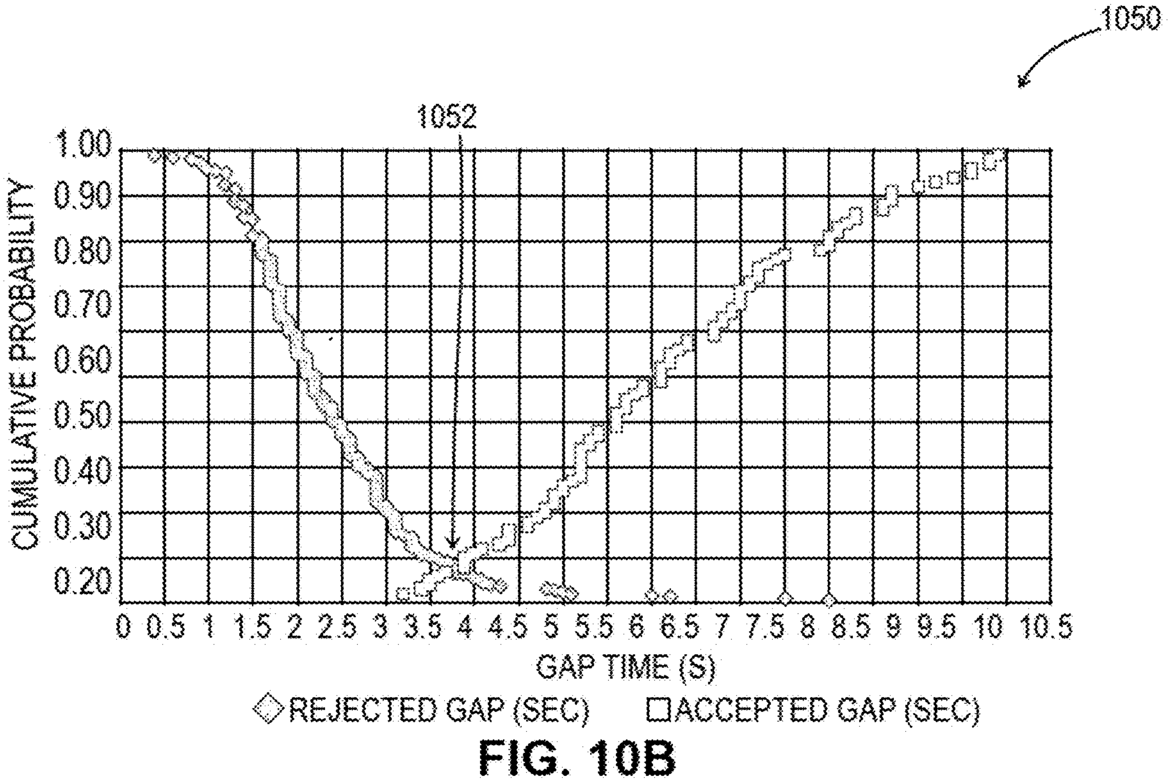
FIG. 10B is a cumulative distribution plot for the outer lane of a roundabout using Raff's method according to some embodiments of the disclosure.

FIG. 10A is a cumulative distribution plot 1000 using Raff's method for the inner lane of the roundabout shown in FIG. 9A, whereas FIG. 10B is a cumulative distribution plot 1050 for the outer lane using Raff's method. The follow-up headway is determined by taking the average of all the follow-up headways. The critical headways 1002 and 1052 (at the point where the plotted curves cross) in seconds, and follow-up headways for both the inner and outer lanes, are given in Table 4 below. An acceptable range of accepted headways used was 3-10 seconds because 10 seconds adequately captures real headways that are observed by the driver. Longer headways were not considered because they could not be reasonably observed by the driver. The longer threshold ensured that no errors occur. It was observed that accepted headways lower than 3 seconds were due to detection zone issues of vehicles not following the usual travel lane path.

TABLE 4

Critical Headway and Follow-up Headway

| | Lane | | |
|---|---|---|---|
| | Inner Lane (sec) | Outer Lane (sec) | Percent Difference |
| Critical Headway (sec) | 4.2 | 3.9 | 7.4% |
| Follow-up Headways (sec) | 2.6 | 2.5 | 3.9% |

Highway Capacity Manual (HCM) calibration was conducted for both entry lanes based on the gap parameter results and was compared to the HCM 2016 and Nevada calibrations. Equation 5 below is the capacity equation for the HCM 2016; Equation 6 is the capacity equation derived for the State of Nevada; Equation 7 is the capacity equation for the inner lane of the study; and Equation 8 is the capacity equation for the study regarding the outer lane.

Figure 11:
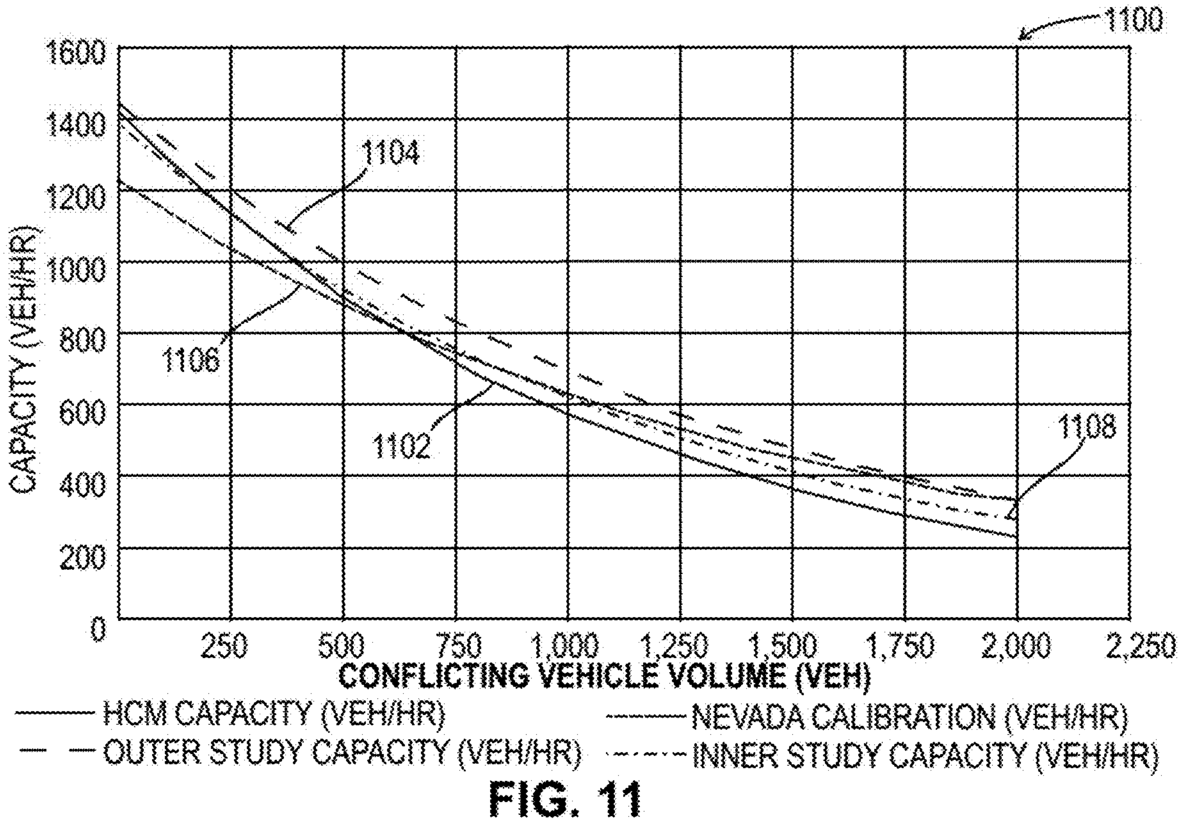
FIG. 11 is a graph of Conflicting Vehicle Volume (VEH) in vehicles per hour representing the difference between various capacity equations in accordance with some embodiments of the disclosure.

FIG. 11 is a graph of conflicting vehicle volume (VEH) 1100 representing the difference between each capacity equation. In particular, the solid line 1102 represents the HCM capacity (vehicles/hour), the dotted line 1104 represents the Outer Study Capacity (vehicles/hour), the dotted line 1106 represents the Nevada Calibration (vehicle/hour), and the dotted line 1108 represents the Inner Study Capacity (vehicle/hour).

$$C = 1{,}420e^{(-0.91\times10-3)vc} \quad (5)$$

$$C = 1{,}230e^{(-0.67\times10-3)vc} \quad (6)$$

$$C = 1{,}385e^{(-0.81\times10-3)vc} \quad (7)$$

$$C = 1{,}440e^{(-0.74\times10-3)vc} \quad (8)$$

The purpose of the study was to propose an automatic method for extracting headway information from roadside LiDAR trajectory data. The study results indicated that the results obtained using the disclosed methods, as compared to results from the HCM 2016 and Nevada capacity equations, proved to be similar to industry standard equations. Thus, operational information such as headway and capacity for roundabouts, used by industry traffic engineers across the country, can advantageously be provided at much faster rates by using the proposed methods. Furthermore, extended studies can beneficially be derived from the methods disclosed herein for roundabouts, such as analysis of the other legs of the roundabout, analysis with consideration of high pedestrian volumes, analyzing roundabout data under conditions of high or heavy vehicle volume, and analyzing data collected at a small roundabout. The methods disclosed herein may also be applied to vehicle-pedestrian interactions at unsignalized intersections such as two-way stop-controlled intersections and roundabouts via yield rate extraction. The proposed methods could also provide unique analyses at merging situations at freeway on-ramps.

Figure 12:
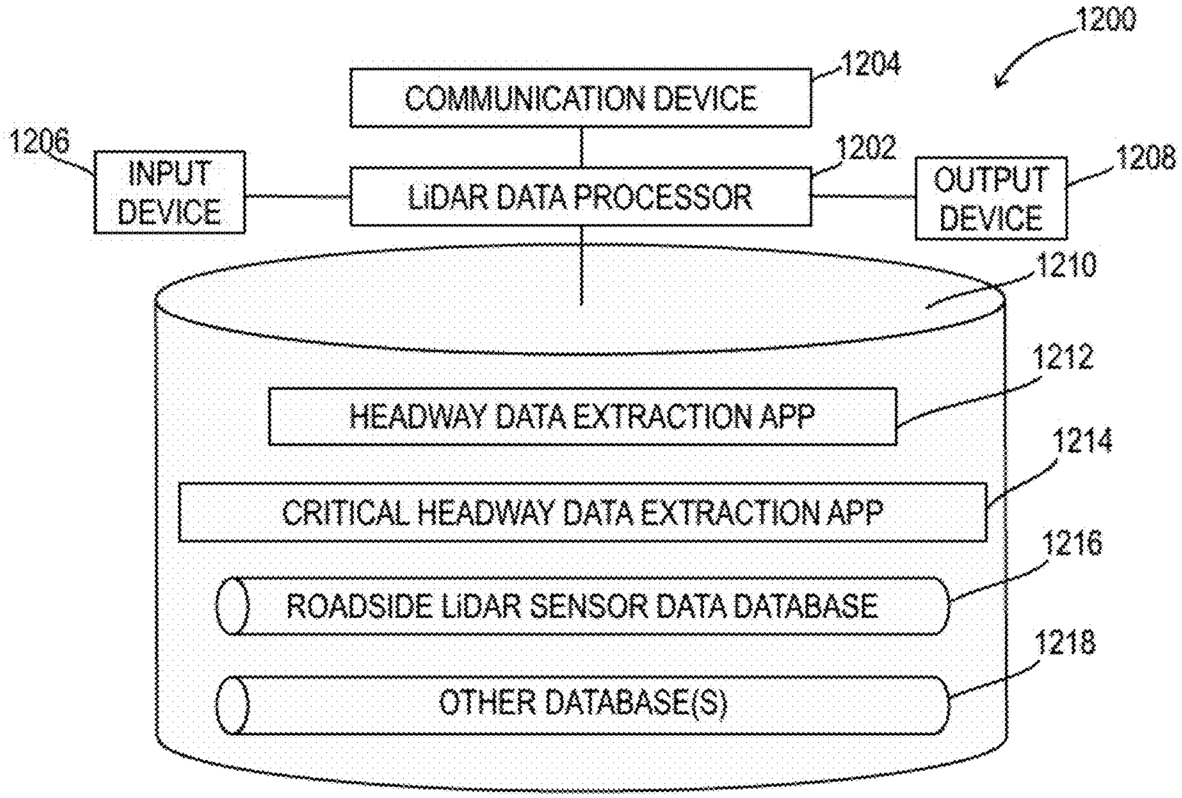
FIG. 12 is a block diagram of a roadside LiDAR data processing computer according to some embodiments of the disclosure.

FIG. 12 is a block diagram of a roadside LiDAR data processing computer 1200 according to an embodiment. The roadside LiDAR data processing computer 1200 may be controlled by software to cause it to operate in accordance with aspects of the methods presented herein concerning processing traffic data generated by one or more roadside LiDAR sensors. In particular, the roadside LiDAR data processing computer 1200 may include a roadside LiDAR data processor 1202 operatively coupled to a communication device 1204, an input device 1206, an output device 1208, and a storage device 1210. However, it should be understood that, in some embodiments the roadside LiDAR data processing computer 1200 may include several computers or a plurality of server computers that work together as part of a system to facilitate processing of roadside LiDAR data generated by a roadside LiDAR sensor or roadside LiDAR sensor system. In such a system, different portions of the overall method for facilitating processing of raw LiDAR sensor data may be provided by one or more computers in communication with one or more other computers such that an appropriate scaling up of computer availability may be provided if and/or when greater workloads, for example a large amount of raw traffic data from one or more LiDAR sensors, is encountered.

The roadside LiDAR data computer 1200 may constitute one or more processors, which may be special-purpose processor(s), that operate to execute processor-executable steps contained in non-transitory program instructions described herein, such that the traffic data processing computer 1000 provides desired functionality.

Communication device 1204 may be used to facilitate communication with, for example, electronic devices such as roadside LiDAR sensors, traffic lights, transmitters and/or remote server computers and the like devices. The communication device 1204 may, for example, have capabilities for engaging in data communication (such as traffic data communications) over the Internet, over different types of computer-to-computer data networks, and/or may have wireless communications capability. Any such data communication may be in digital form and/or in analog form.

Input device 1206 may comprise one or more of any type of peripheral device typically used to input data into a computer. For example, the input device 1206 may include a keyboard, a computer mouse and/or a touchpad or touchscreen. Output device 1208 may comprise, for example, a display screen (which may be a touchscreen) and/or a printer and the like.

Storage device 1210 may include any appropriate information storage device, storage component, and/or non-transitory computer-readable medium, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as flash memory devices. Any one or more of the listed storage devices may be referred to as a "memory", "storage" or a "storage medium."

The term "computer-readable medium" as used herein refers to any non-transitory storage medium that participates in providing data (for example, computer executable instructions or processor executable instructions) that may be read by a computer, a processor, an electronic controller and/or a like device. Such a medium may take many forms, including but not limited to, non-volatile media and volatile media. Non-volatile media may include, for example, optical or magnetic disks and other persistent memory. Volatile media may include dynamic random-access memory (DRAM). Common forms of computer-readable media include, for example, a floppy disk, a flexible disk, hard disk, magnetic tape, a solid state drive (SSD), any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Various forms of computer readable media may be involved in providing sequences of computer processor-executable instructions to a processor. For example, sequences of instruction (i) may be delivered from RAM to a processor, (ii) may be wirelessly transmitted, and/or (iii) may be formatted according to numerous formats, standards or protocols, such as Transmission Control Protocol, Internet Protocol (TCP/IP), Wi-Fi, Bluetooth, TDMA, CDMA, and 3G.

Referring again to FIG. 12, storage device 1210 stores one or more programs for controlling the processor 1202. The programs comprise program instructions that contain processor-executable process steps of the roadside LiDAR data processing computer 1200, including, in some cases, process steps that constitute processes or methods provided in accordance with principles of the processes disclosed herein. In some embodiments, such programs may include a Headway Data Extraction Application 1212 and a Critical Headway Data Extraction Application 1214 for processing traffic data received from one or more roadside LiDAR sensors.

The storage device 1210 may also include one or more roadside Lidar sensor data database(s) 1216 which may store, for example, prior traffic trajectory data and the like, and which may also include computer executable instructions for controlling the roadside LiDAR data computer 1200 to process raw LiDAR sensor data and/or information to track vehicles and/or to determine headways as disclosed herein. The storage device 1210 may also include one or more other database(s) 1218 and/or have connectivity to other databases (not shown) which may be required for operating the traffic data processing computer 1200.

Application programs and/or computer readable instructions run by the roadside LiDAR data processing computer 1200, as described above, may be combined in some embodiments, as convenient, into one, two or more application programs. Moreover, the storage device 1210 may store other programs or applications, such as one or more operating systems, device drivers, database management software, web hosting software, and the like.

Accordingly, some embodiments disclosed herein concern methods for automatically extracting headway information from roadside LiDAR trajectory data. In some implementations, the headway information from roadside LiDAR trajectory data is processed through Python Scripts and/or ArcGIS software which allows for faster turnover times for analysis as compared to conventional methods. In addition, the LiDAR trajectory data may provide vehicle speed data and timestamps which are useful to determine the critical headway for vehicles that have stopped, for example, at an intersection such as a roundabout entry lane, and to determine the entry capacity at a roundabout. Moreover, using the high-resolution traffic trajectories, an altogether more detailed analysis of the behavior level of road users can be provided to gain greater insight on the operational and safety performances of the road. Thus, the disclosed systems and methods for automatically processing headway extraction data and then providing an analysis of various aspects including providing headway information replaces the need to have researchers manually extract such data using video data, and then using software to assist in processing the video data to generate desired headway information.

As used herein, the term "computer" should be understood to encompass a single computer or two or more computers in communication with each other.

As used herein, the term "processor" should be understood to encompass a single processor or two or more processors in communication with each other.

As used herein, the term "memory" should be understood to encompass a single memory or storage device or two or more memories or storage devices.

As used herein, a "server" includes a computer device or system that responds to numerous requests for service from other devices.

As used herein, the term "module" refers broadly to software, hardware, or firmware (or any combination thereof) components. Modules are typically functional components that can generate useful data or other output using specified input(s). A module may or may not be self-contained. An application program (sometimes called an "application" or an "app" or "App") may include one or more modules, or a module can include one or more application programs.

The above descriptions and illustrations of processes herein should not be considered to imply a fixed order for performing the process steps. Rather, the process steps may be performed in any order that is practicable, including simultaneous performance of at least some steps and/or omission of steps.

Although the present disclosure has been described in connection with specific example embodiments, it should be understood that various changes, substitutions, and alterations apparent to those skilled in the art can be made to the disclosed embodiments without departing from the spirit and scope of the disclosure.

What is claimed is:

1. A method for extracting headway information from LiDAR trajectory data received from a roadside LiDAR sensor system comprising:

pre-processing, by a LiDAR data processor, raw roadside LiDAR sensor data, the pre-processing including filtering, by the LiDAR data processor, background information from the raw roadside LiDAR sensor data;

clustering, by the LiDAR data processor, objects in the filtered LiDAR sensor data;

classifying, by the LiDAR data processor, the clustered objects, wherein the clustered objects represent road users;

tracking, by the LiDAR data processor, movement of the clustered objects in real-time to extract trajectory and speed data; and mapping, by the LiDAR data processor, the extracted trajectory and speed data such that the clustered objects are georeferenced;

extracting, by the LiDAR data processor, headway data from the pre-processed raw roadside LiDAR sensor data; and extracting, by the LiDAR data processor, critical headway data from the extracted headway data.

2. The method of claim 1, wherein filtering comprises:

aggregating, by the LiDAR data processor, multiple LiDAR sensor data frames;

dividing, by the LiDAR data processor, the aggregated frames into small and continuous three-dimensional (3D) cubes;

identifying, by the LiDAR data processor, laser points in the 3D cubes as background cloud points; and excluding, by the LiDAR data processor, the background cloud points.

3. The method of claim 2, wherein identifying a laser point in the 3D cubes as a background cloud point comprises determining, by the LiDAR data processor, a background cloud point when the number of laser points exceeds a threshold value.

4. The method of claim 1, further comprising prior to tracking the movement of clustered objects, assigning, by the LiDAR data processor, a unique identifier to each clustered object.

5. The method of claim 1, wherein clustering comprises utilizing one of a density-based spatial clustering application with a noise (DBSCAN) or an adaptive DBSCAN clustering algorithm.

6. The method of claim 1, further comprising uploading, by the LiDAR data processor, the mapped data into an ArcGIS program for further analysis.

7. The method of claim 1, further comprising displaying, by the LiDAR data processor, the critical headway data on a display screen.

8. The method of claim 1, further comprising calibrating, by the LiDAR data processor, a Highway Capacity Manual (HCM) capacity equation.

9. A roadside LiDAR data processing computer for extracting headway information from LiDAR trajectory data comprising:

a LiDAR data processor;

a communication device operatively coupled to the LiDAR data processor; and a storage device operatively coupled to the LiDAR data processor, wherein the storage device stores processor executable instructions which when executed cause the LiDAR data processor to:

pre-process raw roadside LiDAR sensor data received from a roadside LiDAR sensor system by executing instructions which cause the LiDAR data processor to filter background information from the raw roadside LiDAR sensor data;

cluster objects in the filtered LiDAR sensor data;

classify the clustered objects, wherein the clustered objects represent road users;

track movement of the clustered objects in real-time to extract trajectory and speed data; and map the extracted trajectory and speed data such that clustered objects are georeferenced;

extract headway data from the pre-processed raw roadside LiDAR sensor data; and extract critical headway data from the extracted headway data.

10. The roadside LiDAR data processing computer of claim 9, wherein the storage device stores further processor executable instructions, with regard to filtering, which when executed cause the LiDAR data processor to:

aggregate multiple LiDAR sensor data frames;

divide the aggregated frames into small and continuous three-dimensional (3D) cubes;

identify laser points in the 3D cubes as background cloud points; and exclude the background cloud points.

11. The roadside LiDAR data processing computer of claim 10, wherein the instructions for identifying a laser point in the 3D cubes as a background cloud point comprises further processor executable instructions, which when executed cause the LiDAR data processor to determine a background cloud point when the number of laser points exceeds a threshold value.

12. The roadside LiDAR data processing computer of claim 9, wherein the storage device comprises further processor executable instructions, prior to the instructions for tracking the movement of clustered objects, which cause the LiDAR data processor to assign a unique identifier to each clustered object.

13. The roadside LiDAR data processing computer of claim 9, wherein the instructions for clustering comprises further processor executable instructions, which when executed causes the LiDAR data processor to utilize one of a density-based spatial clustering application with a noise (DBSCAN) or an adaptive DBSCAN clustering algorithm.

14. The roadside LiDAR data processing computer of claim 9, wherein the storage device stores further processor executable instructions which when executed cause the LiDAR data processor to upload the mapped data into an ArcGIS program for further analysis.

15. The roadside LiDAR data processing computer of claim 9, further comprising a display screen operably coupled to the LiDAR data processor, and wherein the storage device stores further processor executable instructions which when executed cause the LiDAR data processor to display the critical headway data on the display screen.

16. The roadside LiDAR data processing computer of claim 9, wherein the storage device stores further processor executable instructions which when executed cause the LiDAR data processor to calibrate a Highway Capacity Manual (HCM) capacity equation.

* * * * *